US012222870B2

(12) United States Patent
Lee et al.

(10) Patent No.: US 12,222,870 B2
(45) Date of Patent: Feb. 11, 2025

(54) METHOD AND APPARATUS FOR PERFORMING MAPPING TABLE MANAGEMENT OF MEMORY DEVICE IN PREDETERMINED COMMUNICATIONS ARCHITECTURE WITH AID OF TABLE ANALYSIS

(71) Applicant: Silicon Motion, Inc., Hsinchu County (TW)

(72) Inventors: Jie-Hao Lee, Hsinchu County (TW); Chun-Ju Chen, Taichung (TW)

(73) Assignee: Silicon Motion, Inc., Hsinchu County (TW)

( * ) Notice: Subject to any disclaimer, the term of this patent is extended or adjusted under 35 U.S.C. 154(b) by 83 days.

(21) Appl. No.: 18/116,311

(22) Filed: Mar. 2, 2023

(65) Prior Publication Data
US 2024/0296126 A1    Sep. 5, 2024

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/7201* (2013.01); *G06F 2212/7203* (2013.01); *G06F 2212/7205* (2013.01)

(58) Field of Classification Search
CPC ..... G06F 2212/7203; G06F 2212/7201; G06F 2212/7205; G06F 12/0246; G06F 12/0891; G06F 3/0652
See application file for complete search history.

(56) References Cited

U.S. PATENT DOCUMENTS

| | | | |
|---|---|---|---|
| 2009/0287898 A1 | 11/2009 | Hara | |
| 2017/0185322 A1* | 6/2017 | Stephens | ............... G06F 12/128 |
| 2018/0089076 A1* | 3/2018 | Li | ........................ G06F 3/0665 |
| 2019/0286554 A1* | 9/2019 | Berke | ..................... G06F 12/02 |
| 2020/0089620 A1 | 3/2020 | Hsu | |
| 2020/0218470 A1* | 7/2020 | Cho | ...................... G06F 3/0679 |
| 2020/0356491 A1 | 11/2020 | Yen | |
| 2021/0064521 A1* | 3/2021 | Cho | .................... G06F 12/0873 |
| 2021/0165735 A1* | 6/2021 | Chung | .................. G06F 3/0652 |

FOREIGN PATENT DOCUMENTS

TW             202138988 A    10/2021

* cited by examiner

*Primary Examiner* — Curtis James Kortman
(74) *Attorney, Agent, or Firm* — Winston Hsu

(57) ABSTRACT

A method for performing mapping table management of a memory device in a predetermined communications architecture with aid of table analysis and associated apparatus are provided. The method may include: utilizing the memory controller to receive a first command from a host device through a transmission interface circuit of the memory controller; and in response to the first command, loading a local logical-to-physical (L2P) address mapping table from a non-volatile (NV) memory into a volatile memory within the memory controller to be a temporary L2P address mapping table, changing multiple L2P table entries in the temporary L2P address mapping table to be multiple updated L2P table entries in a group-by-group manner, rather than an entry-by-entry manner, and updating the local L2P address mapping table in the NV memory according to the multiple updated L2P table entries of the temporary L2P address mapping table.

10 Claims, 15 Drawing Sheets

METHOD AND APPARATUS FOR PERFORMING MAPPING TABLE MANAGEMENT OF MEMORY DEVICE IN PREDETERMINED COMMUNICATIONS ARCHITECTURE WITH AID OF TABLE ANALYSIS

BACKGROUND OF THE INVENTION

1. Field of the Invention

The present invention is related to memory control, and more particularly, to a method and apparatus for performing mapping table management of a memory device in a predetermined communications architecture with aid of table analysis.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store various files such as system files, user files, etc. in a file system of a host. As time goes by, some data stored in the memory device may become invalid data. When some invalid data and some valid data are mixed together in the same storage block within the memory device, it is typically needed to perform garbage collection (GC) to release more storage space for further use. According to the related art, the host may send information related to unused storage space to the memory device, to allow the memory device to release more storage space for further use. As a result, the memory device may need to change internal management information of the memory device correspondingly, causing a working load of a controller integrated circuit (IC) in the memory device to be abruptly increased. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing mapping table management of a memory device in a predetermined communications architecture (e.g., a UFS communications architecture) with aid of table analysis, in order to solve the above-mentioned problems.

At least one embodiment of the present invention provides a method for performing mapping table management of a memory device in a predetermined communications architecture with aid of table analysis, where the method can be applied to a memory controller of the memory device. The memory device may comprise the memory controller and a non-volatile (NV) memory, the NV memory may comprise at least one NV memory element (e.g., one or more NV memory elements), and the at least one NV memory element may comprise a plurality of blocks. The method may comprise: utilizing the memory controller to receive a first command from a host device through a transmission interface circuit of the memory controller, wherein the first command indicates that first partial storage space corresponding to a first logical address range will not be used by the host device; and in response to the first command, loading a local logical-to-physical (L2P) address mapping table from the NV memory into a volatile memory within the memory controller to be a temporary L2P address mapping table, changing multiple L2P table entries in the temporary L2P address mapping table to be multiple updated L2P table entries in a group-by-group manner, rather than an entry-by-entry manner, and updating the local L2P address mapping table in the NV memory according to the multiple updated L2P table entries of the temporary L2P address mapping table, for unmapping at least one portion of pages among all pages of at least one block of the plurality of blocks, wherein the first partial storage space comprises the at least one portion of pages.

In addition to the above method, the present invention also provides a memory controller of a memory device, where the memory device comprises the memory controller and an NV memory. The NV memory may comprise at least one NV memory element (e.g., one or more NV memory elements), and the at least one NV memory element may comprise a plurality of blocks. In addition, the memory controller comprises a processing circuit that is arranged to control the memory controller according to a plurality of host commands from a host device, to allow the host device to access the NV memory through the memory controller, wherein the processing circuit is arranged to perform mapping table management of the memory device in a predetermined communications architecture with aid of table analysis. The memory controller further comprises a transmission interface circuit, and the transmission interface circuit is arranged to perform communications with the host device. For example, the memory controller receives a first command from the host device through the transmission interface circuit of the memory controller, wherein the first command indicates that first partial storage space corresponding to a first logical address range will not be used by the host device; and in response to the first command, the memory controller loads a local logical-to-physical (L2P) address mapping table from the NV memory into a volatile memory within the memory controller to be a temporary L2P address mapping table, changes multiple L2P table entries in the temporary L2P address mapping table to be multiple updated L2P table entries in a group-by-group manner, rather than an entry-by-entry manner, and updates the local L2P address mapping table in the NV memory according to the multiple updated L2P table entries of the temporary L2P address mapping table, for unmapping at least one portion of pages among all pages of at least one block of the plurality of blocks, wherein the first partial storage space comprises the at least one portion of pages.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the electronic device.

According to some embodiments, the memory device may store data for the host device, where updating some data among the stored data may be needed. In addition, the host device may send the first command carrying first information (e.g., a first beginning logical address and a first length) to the memory controller to notify the memory controller of the first logical address range, to allow the memory device to release more storage space for further use. Additionally, it is suggested that the memory device may operate according to at least one control scheme (e.g., one or more control schemes) of the method to perform associated operations, and more particularly, load internal management information such as at least one address mapping table (e.g., one or more address mapping tables) from the NV memory into a volatile memory within the memory controller to be a temporary version of the internal management information, change the temporary version of the internal management information with a dedicated hardware circuit within the memory controller to be an updated version of the internal management information, having no need to process the temporary version of the internal management information in an entry-by-entry manner, and update the internal management information in the NV memory according to the updated version of the internal management information in the volatile memory.

The present invention method and apparatus can guarantee that the memory device can operate properly in various situations. For example, the memory device can update the internal management information in the NV memory efficiently, having no need to process the temporary version of the internal management information in an entry-by-entry manner, and thereby to enhance overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
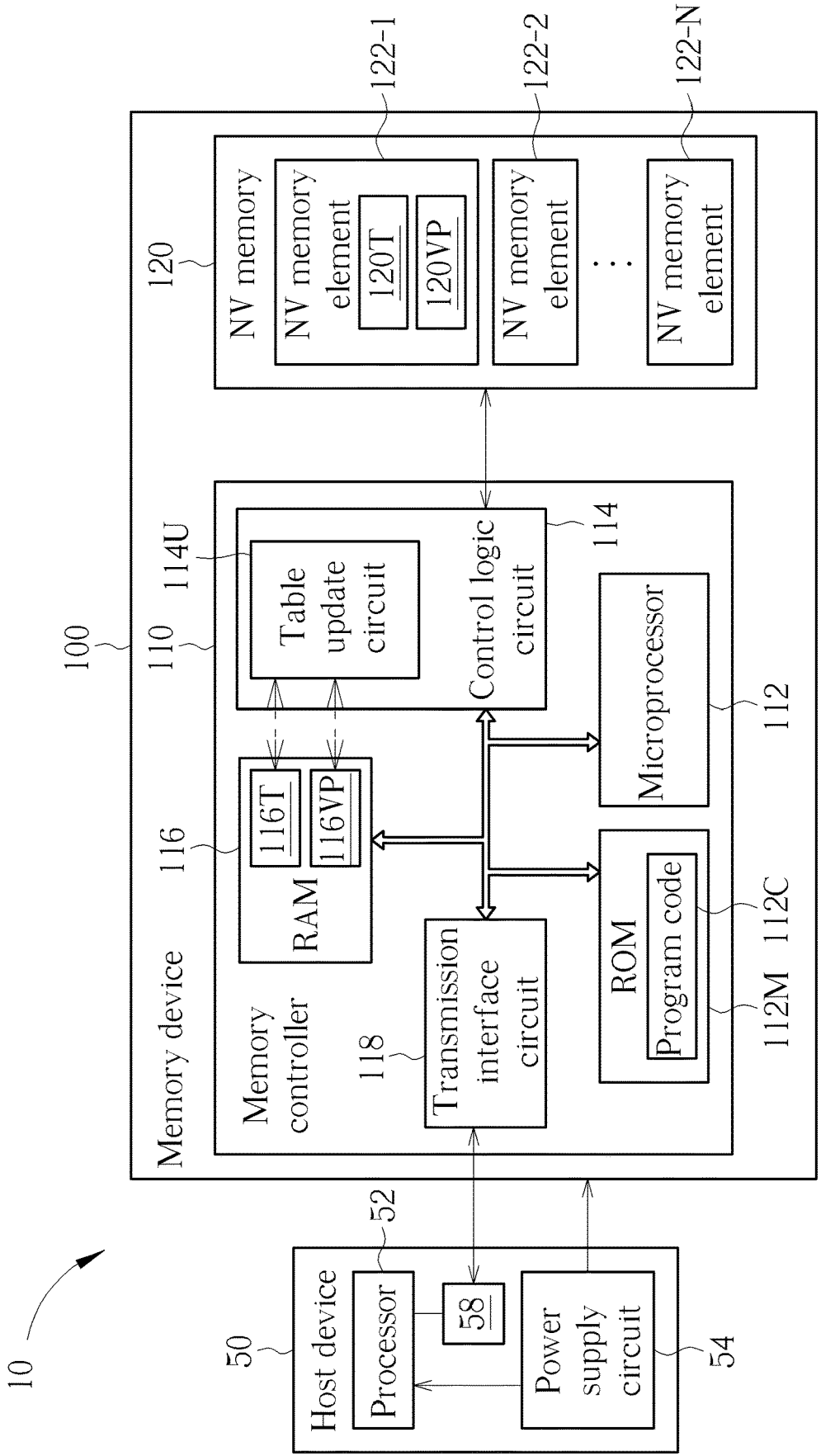
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a Random Access Memory (RAM) 116 (which may be implemented by way of Static Random Access Memory (SRAM), for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise a table update circuit 114U for updating internal management information such as at least one table (e.g., one or more tables) under control of the processing circuit such as the microprocessor 112, and may further comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. In addition, the memory controller 110 may generate or update a first physical-to-logical (P2L) address mapping table (not shown in FIG. 1) in the NV memory 120, and generate or update a valid page count table 120VP in the NV memory 120. For example, the memory controller 110 may refer to the first P2L address mapping table and the valid page count table 120VP to perform garbage collection (GC) operations.

For better comprehension, the global L2P address mapping table 120T may be located in a predetermined region within the NV memory element 122-1, such as a system region, where the valid page count table 120VP may be located in the predetermined region (e.g., the system region) within the NV memory element 122-1, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table (e.g., a first local L2P address mapping table) among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto. For example, when there is a needed, the memory controller 110 may load the valid page count table 120VP into the RAM 116 to be a temporary valid page count table 116VP.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval [1, N]) within the NV memory elements 122-1, 122-2, . . . , and 122-N may comprise multiple blocks, and a block within the multiple blocks may comprise and record a specific number of pages, where the memory controller 110 may access a certain page of a certain block within the multiple blocks according to a block address and a page address.

According to some embodiments, the memory controller 110 may monitor valid page counts of the plurality of blocks, respectively, for subsequent processing such as the GC operations, where the valid page count table 120VP may be arranged to store the respective valid page counts of the plurality of blocks. Regarding data reception, the memory controller 110 may configure at least one block (e.g., one or more blocks) among the plurality of blocks of the aforementioned at least one NV memory element (e.g., the one or more NV memory elements such as {122-1, 122-2, . . . , 122-N}) in the NV memory 120 to be at least one active block (e.g., one or more active blocks), and utilize the aforementioned at least one active block to receive and store data from the host device 50, such as host-write data. For example, the data such as the host-write data (e.g., the data to be written into the NV memory 120) may comprise a plurality of sets of partial data, and the aforementioned at least one active block may comprise a first active block. In addition, the memory controller 110 may maintain (e.g., generate or update) a temporary P2L address mapping table in the RAM 116, in order to perform the associated internal management.

During receiving and storing the data such as the host-write data (e.g., the data to be written into the NV memory 120) from the host device 50, the memory controller 110 may utilize the first active block to receive and store one or more sets of partial data among the plurality of sets of partial data, and record P2L table entries into the temporary P2L address mapping table, for indicating P2L address mapping relationships regarding the first active block. The P2L address mapping relationships indicated by the P2L table entries may represent the P2L address mapping relationships between the logical addresses at which the one or more sets of partial data are written by the host device 50 and the physical addresses indicating the locations where the one or more sets of partial data are stored in the first active block. When a first predetermined criterion (e.g., the first active block is fully programmed) is met, the memory controller 110 may perform a set of table-related processing operations, and the set of table-related processing operations may comprise:

(1) a first table-related processing operation: updating the global L2P address mapping table 120T (e.g., some L2P table entries therein) according to the temporary P2L address mapping table (e.g., the P2L table entries therein), for indicating L2P address mapping relationships regarding the first active block;

(2) a second table-related processing operation: updating the first P2L address mapping table in the NV memory 120 according to the temporary P2L address mapping table, for example, by writing all P2L table entries recorded in the temporary P2L address mapping table into the first P2L address mapping table, for performing the subsequent processing mentioned above; and (3) a third table-related processing operation: after updating the global L2P address mapping table 120T and the first P2L address mapping table according to the temporary P2L address mapping table, clearing the temporary P2L address mapping table (e.g., the P2L table entries therein), for reusing the temporary P2L address mapping table and/or the corresponding storage space in the RAM 116;

where the first table-related processing operation may comprise loading a certain local L2P address mapping table (e.g., the first local L2P address mapping table) within the global L2P address mapping table 120T into the RAM 116 to be the temporary L2P address mapping table 116T, updating one or more L2P table entries in the temporary L2P address mapping table 116T to indicate one or more L2P address mapping relationships among the L2P address mapping relationships regarding the first active block, and updating the global L2P address mapping table 120T (e.g., this local L2P address mapping table therein) according to the temporary L2P address mapping table 116T, but the present invention is not limited thereto. The first predetermined criterion may be replaced with any criterion among multiple predetermined criteria, to allow the memory controller 110 to perform the set of table-related processing operations when the aforementioned any criterion is met. For example, the multiple predetermined criteria may comprise:

(1) the first predetermined criterion: the first active block is fully programmed; and (2) a second predetermined criterion: the number of P2L table entries recorded in the temporary P2L address mapping table reaches a predetermined entry count;

where the predetermined entry count may represent a predetermined table size of the temporary P2L address mapping table. For example, when the first active block is fully programmed or the number of P2L table entries recorded in the temporary P2L address mapping table reaches the predetermined entry count, the memory controller 110 may perform the set of table-related processing operations.

In addition, the memory controller 110 may record at least one valid page count (e.g., one or more valid page counts) of the aforementioned at least one active block (e.g., the first active block) in the temporary valid page count table 116VP to indicate the number(s) of valid pages in the aforementioned at least one active block, and update the valid page count table 120VP according to the temporary valid page count table 116VP, but the present invention is not limited thereto. According to some embodiments, the memory controller 110 may record the aforementioned at least one valid page count of the aforementioned at least one active block into the NV memory 120 directly to update the valid page count table 120VP, for indicating the number(s) of valid pages in the aforementioned at least one active block.

After any active block (e.g., the first active block) among the aforementioned at least one active block is fully programmed, the memory device 100 (e.g., the memory controller 110) may close the aforementioned any active block to make the aforementioned any active block become an inactive block, and select a blank block (e.g., an erased block) to be a replacement of the aforementioned any active block, for performing subsequent data reception corresponding to the aforementioned any active block. In addition, the subsequent processing mentioned above may comprise performing a GC procedure to write valid data among all data in the inactive block into another blank block (e.g., another erased block).

According to some embodiments, as the P2L address mapping relationships indicated by the P2L table entries in the first P2L address mapping table and the L2P address mapping relationships indicated by the associated L2P table entries in the L2P address mapping table 120T are supposed to be inverse address mapping relationships of each other, the memory controller 110 may determine the latest mapping information (e.g., physical addresses) carried by the associated L2P table entries in the L2P address mapping table 120T according to the latest mapping information (e.g., logical addresses) carried by the P2L table entries in the first P2L address mapping table.

Figure 2:
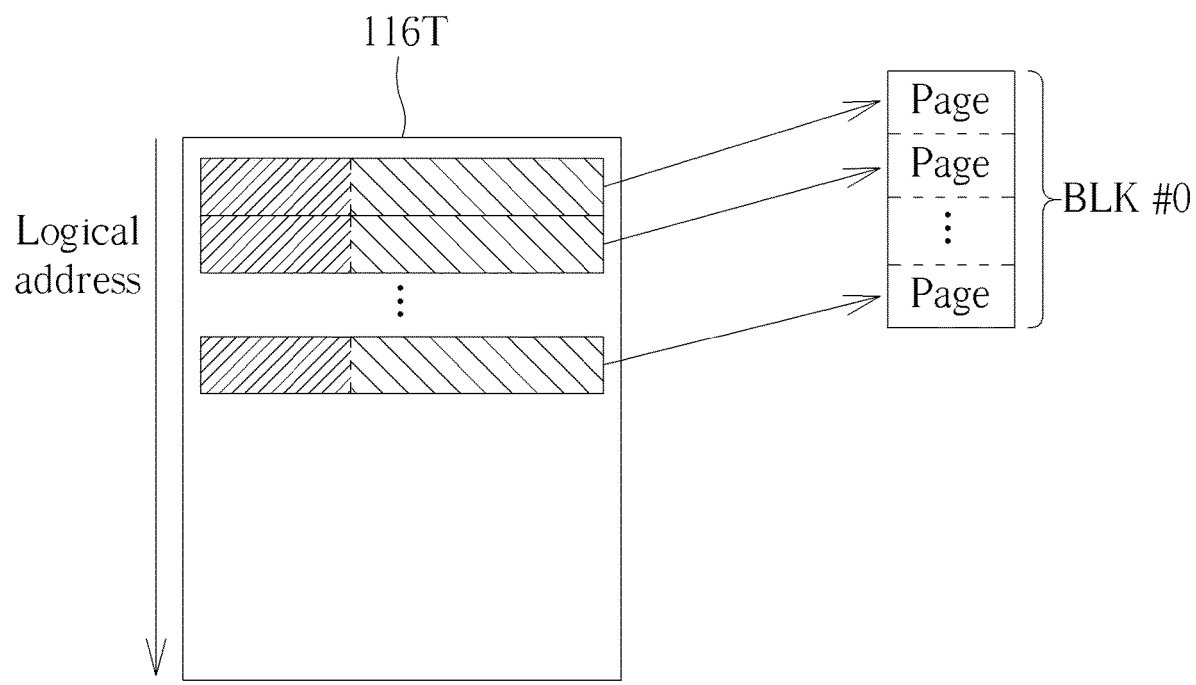
FIG. 2 illustrates an address mapping control scheme involved with physical blocks according to an embodiment of the present invention.

FIG. 2 illustrates an address mapping control scheme involved with physical blocks according to an embodiment of the present invention. For example, in response to at least one write command (e.g., one or more write command) from the host device 50, the memory controller 110 may store data from the host device 50 into the pages of the block (BLK) #0, and more particularly, perform the set of table-related processing operations with respect to the first active block such as the block (BLK) #0. When there is a need, the memory controller 110 may load a certain local L2P address mapping table (e.g., the first local L2P address mapping table) among the plurality of local L2P address mapping tables into the RAM 116 to be the temporary L2P address mapping table 116T, for accessing the data stored in the block (BLK) #0 according to the temporary L2P address mapping table 116T. As a result, the temporary L2P address mapping table 116T may comprise multiple L2P table entries as shown in FIG. 2. The multiple L2P table entries may carry multiple physical addresses of the pages of the block (BLK) #0, for indicating the address mapping relationships between the physical addresses of the pages of the block (BLK) #0 and the logical addresses of the data (e.g., the address mapping relationships as illustrated with the arrows pointing toward the pages of the block (BLK) #0, with respect to the ranking of the multiple L2P table entries corresponding to the logical addresses in the temporary L2P address mapping table 116T), where any physical address among the multiple physical addresses may comprise a physical block address (PBA) and a physical page address (PPA), and the PBA and the PPA may be located in multiple higher bits (e.g., a set of consecutive bits comprising the most significant bit (MSB)) and multiple lower bits (e.g., a set of consecutive bits comprising the least significant bit (LSB)) of the physical address, respectively, but the present invention is not limited thereto.

Before performing the set of table-related processing operations with respect to the first active block such as the block (BLK) #0, during writing the data into the block (BLK) #0, the memory controller 110 may further write the number of valid pages (e.g., the pages storing valid data) among all pages of the block (BLK) #0 into the temporary valid page count table 116VP to be a valid page count of the block (BLK) #0, and more particularly, update the valid page count (e.g., the number of valid pages) of the block (BLK) #0 in real time, for example, at any moment when the valid page count changes. When the data being written into the block (BLK) #0 is sequential data, the valid page count of the block (BLK) #0 may increase, but the present invention is not limited thereto. When the data being written into the block (BLK) #0 is non-sequential data, the valid page count of the block (BLK) #0 may increase or decrease (e.g., depending on whether the host device 50 is asking for rewriting or updating partial data at a same logical address). In addition, the memory controller 110 may update the valid page count table 120VP according to the temporary valid page count table 116VP.

Figure 3:
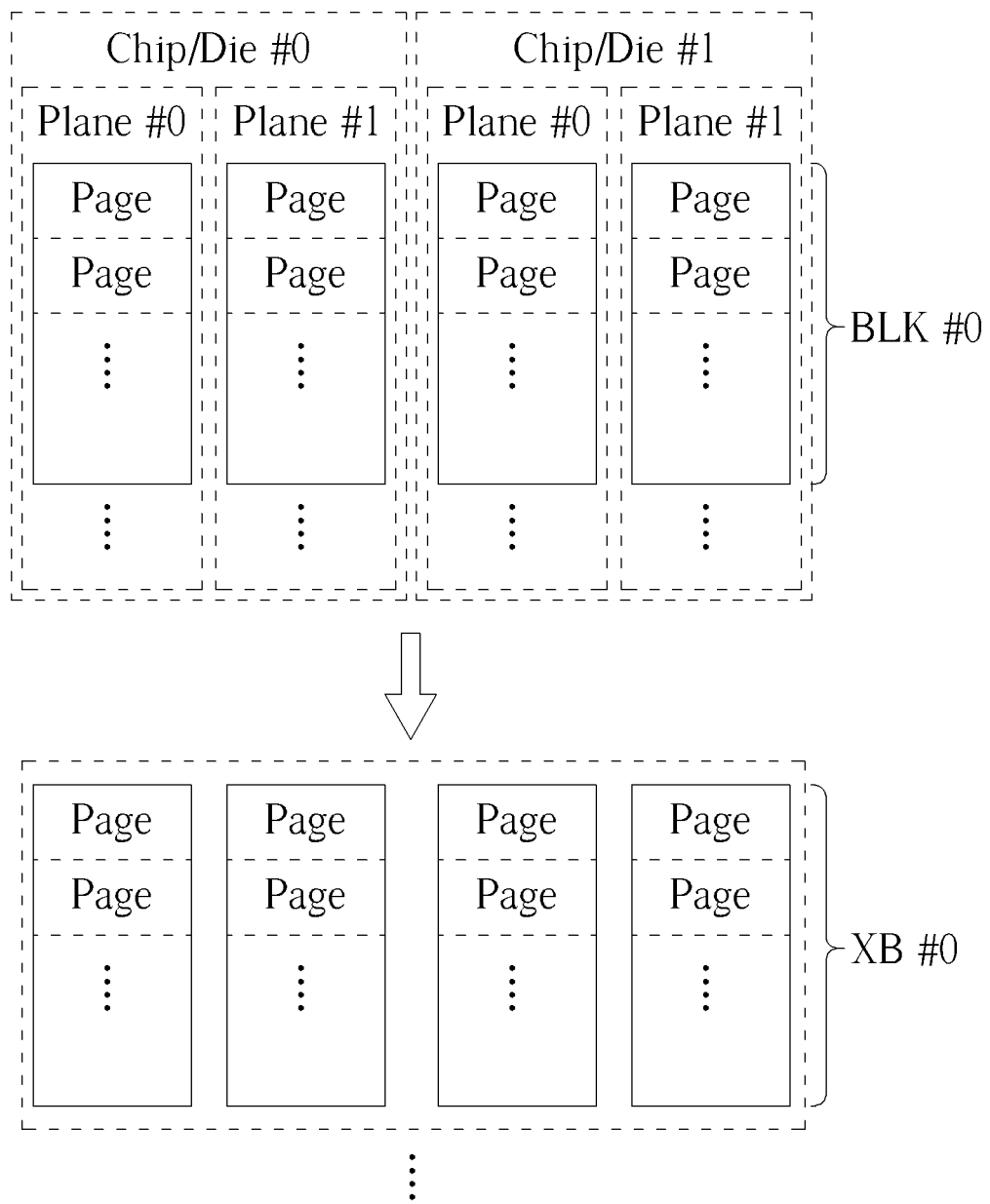
FIG. 3 illustrates a block expansion control scheme according to an embodiment of the present invention.

FIG. 3 illustrates a block expansion control scheme according to an embodiment of the present invention. The plurality of NV memory elements 122-1, 122-2, . . . , and 122-N may comprise at least two memory elements 122-1 and 122-2 such as the chips #0 and #1 or the dies #0 and #1 (respectively labeled "Chip/Die #0" and "Chip/Die #1" for brevity), and the aforementioned any NV memory element 122-n within the NV memory elements 122-1, 122-2, . . . , and 122-N, such as any chip among the chips #0 and #1 or any die among the dies #0 and #1, may comprise multiple planes such as the planes #0 and #1, where any plane among the planes #0 and #1 of the aforementioned any NV memory element 122-n (e.g., the aforementioned any chip among the chips #0 and #1 or the aforementioned any die among the dies #0 and #1) may comprise its own blocks (BLK) #0, #1, etc.

Under control of the memory controller 110, the memory device 100 may combine a set of first corresponding blocks (BLK) #0 in all planes (e.g., the planes #0 and #1) of all NV memory elements (e.g., the chips #0 and #1 or the dies #0 and #1) into a first superblock (XB) #0, but the present invention is not limited thereto. For example, the memory device 100 may combine multiple sets of corresponding blocks (BLK) #0, #1, etc. in all planes (e.g., the planes #0 and #1) of all NV memory elements (e.g., the chips #0 and #1 or the dies #0 and #1) into multiple superblocks (XB) #0, #1, etc., respectively. In addition, the memory controller 110 may access (e.g., read or write) the multiple sets of corresponding blocks (BLK) #0, #1, etc. within the multiple superblocks (XB) #0, #1, etc. according to multiple PBAs, respectively, and more particularly, access (e.g., read or write) the corresponding pages within the multiple superblocks (XB) #0, #1, etc. according to the multiple PBAs and the associated PPAs, respectively. For better comprehension, a same row of blocks (BLK) such as that illustrated in FIG. 3 may represent a set of corresponding blocks (BLK) accessed with a same PBA, and a same row of pages such as that illustrated in FIG. 3 may represent a set of corresponding pages accessed with a same PPA.

For example, the memory controller 110 may access (e.g., read or write) the set of corresponding blocks (BLK) #0 within the superblock (XB) #0 according to a first PBA, and more particularly, access (e.g., read or write) a set of first corresponding pages respectively positioned in the set of corresponding blocks (BLK) #0 within the superblock (XB) #0 according to the first PBA and a first PPA, access (e.g., read or write) a set of second corresponding pages respectively positioned in the set of corresponding blocks (BLK) #0 within the superblock (XB) #0 according to the first PBA and a second PPA, and the rest can be deduced by analogy. For another example, the memory controller 110 may access (e.g., read or write) the set of corresponding blocks (BLK) #1 within the superblock (XB) #1 according to a second PBA, and more particularly, access (e.g., read or write) a set of first corresponding pages respectively positioned in the set of corresponding blocks (BLK) #1 within the superblock (XB) #1 according to the second PBA and a first PPA, access (e.g., read or write) a set of second corresponding pages respectively positioned in the set of corresponding blocks (BLK) #1 within the superblock (XB) #1 according to the second PBA and a second PPA, and the rest can be deduced by analogy.

Figure 4:
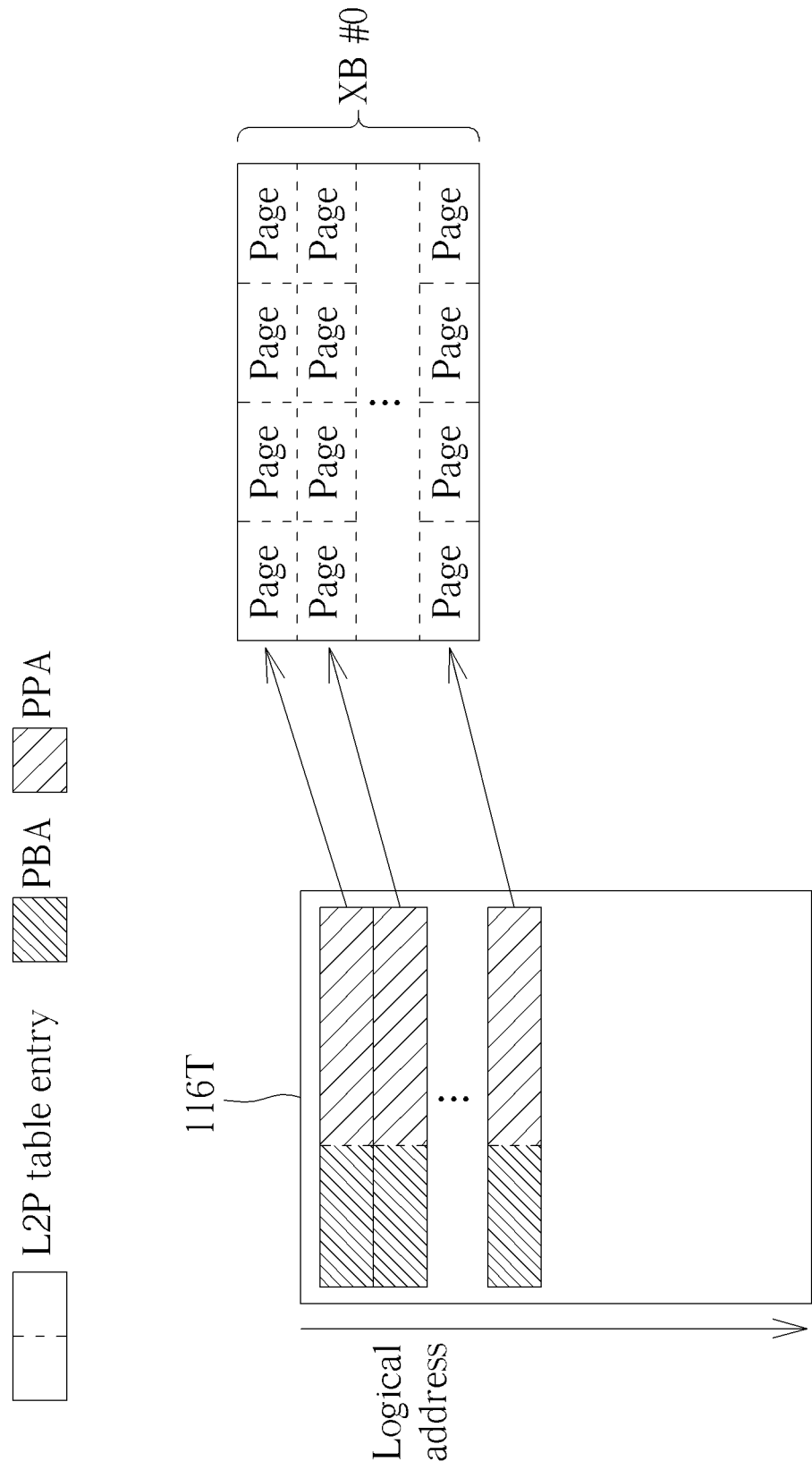
FIG. 4 illustrates an address mapping control scheme involved with superblocks according to an embodiment of the present invention.

FIG. 4 illustrates an address mapping control scheme involved with superblocks according to an embodiment of the present invention. For better comprehension, the superblock (XB) #0 and the pages thereof as shown in FIG. 3 can be taken as examples of the superblock (XB) #0 and the pages thereof as shown in FIG. 4, respectively, but the present invention is not limited thereto. For example, in response to at least one write command (e.g., one or more write command) from the host device 50, the memory controller 110 may store data from the host device 50 into the pages of the superblock (XB) #0, and more particularly, perform the set of table-related processing operations with respect to the aforementioned at least one active block (e.g., the first active block) such as the superblock (XB) #0 (e.g., the set of corresponding blocks (BLK) #0 therein). When there is a need, the memory controller 110 may load a certain local L2P address mapping table (e.g., the first local L2P address mapping table) among the plurality of local L2P address mapping tables into the RAM 116 to be the temporary L2P address mapping table 116T, for accessing the data stored in the superblock (XB) #0 according to the temporary L2P address mapping table 116T. As a result, the temporary L2P address mapping table 116T may comprise multiple L2P table entries as shown in FIG. 4. The multiple L2P table entries may carry multiple physical addresses of the pages of the superblock (XB) #0, for indicating the address mapping relationships between the physical addresses of the pages of the superblock (XB) #0 and the logical addresses of the data (e.g., the address mapping relationships as illustrated with the arrows pointing toward the pages of the superblock (XB) #0, with respect to the ranking of the multiple L2P table entries corresponding to the logical addresses in the temporary L2P address mapping table 116T), where any physical address among the multiple physical addresses may comprise a PBA and a PPA, and the PBA and the PPA may be located in multiple higher bits (e.g., a set of consecutive bits comprising the MSB) and multiple lower bits (e.g., a set of consecutive bits comprising the LSB) of the physical address, respectively, but the present invention is not limited thereto.

Before performing the set of table-related processing operations with respect to the aforementioned at least one active block (e.g., the first active block) such as the superblock (XB) #0 (e.g., the set of corresponding blocks (BLK) #0 therein), during writing the data into the superblock (XB) #0, the memory controller 110 may further write the number of valid pages (e.g., the pages storing valid data) among all pages of the superblock (XB) #0 into the temporary valid page count table 116VP to be a valid page count of the superblock (XB) #0, and more particularly, update the valid page count (e.g., the number of valid pages) of the superblock (XB) #0 in real time, for example, at any moment when the valid page count changes. When the data being written into the superblock (XB) #0 is sequential data, the valid page count of the superblock (XB) #0 may increase, but the present invention is not limited thereto. When the data being written into the superblock (XB) #0 is non-sequential data, the valid page count of the superblock (XB) #0 may increase or decrease (e.g., depending on whether the host device 50 is asking for rewriting or updating partial data at a same logical address). In addition, the memory controller 110 may update the valid page count table 120VP according to the temporary valid page count table 116VP.

Figure 5:
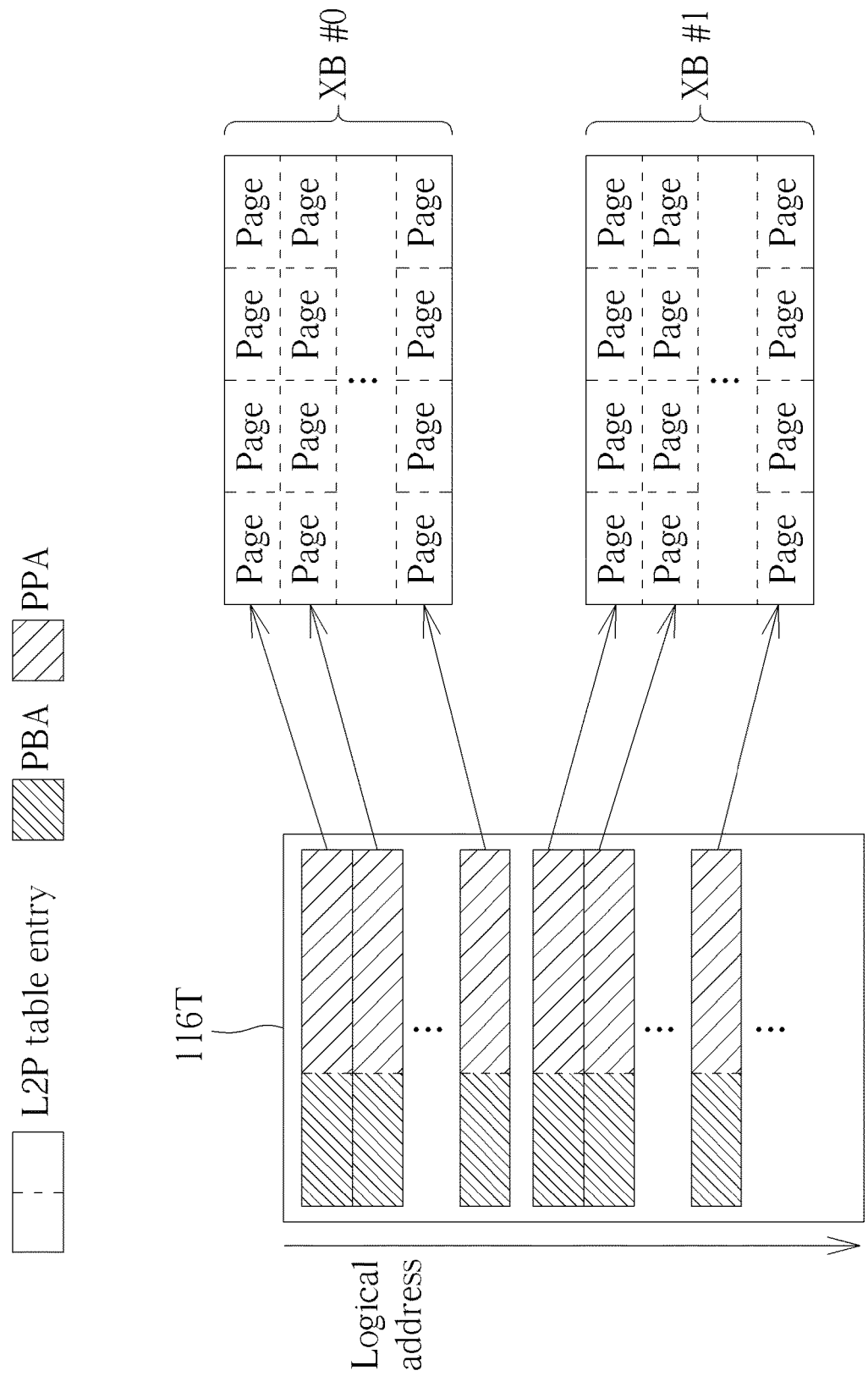
FIG. 5 illustrates an address mapping control scheme involved with superblocks according to another embodiment of the present invention.

FIG. 5 illustrates an address mapping control scheme involved with superblocks according to another embodiment of the present invention. In comparison with the embodiment shown in FIG. 4, the memory controller 110 may perform similar operations when writing data into the pages of the superblocks (XB) #0, #1, etc. For example, in response to at least one write command (e.g., one or more write command) from the host device 50, the memory controller 110 may store data from the host device 50 into the pages of the superblocks (XB) #0, #1, etc., and more particularly, perform the set of table-related processing operations with respect to the aforementioned at least one active block (e.g., the first active block) such as the superblocks (XB) #0, #1, etc. (e.g., the corresponding blocks (BLK) therein). When there is a need, the memory controller 110 may load a certain local L2P address mapping table (e.g., the first local L2P address mapping table) among the plurality of local L2P address mapping tables into the RAM 116 to be the temporary L2P address mapping table 116T, for accessing the data stored in the superblocks (XB) #0, #1, etc. according to the temporary L2P address mapping table 116T. As a result, the temporary L2P address mapping table 116T may comprise multiple L2P table entries as shown in FIG. 5. The multiple L2P table entries may carry multiple physical addresses of the pages of the superblocks (XB) #0, #1, etc., for indicating the address mapping relationships between the physical addresses of the pages of the superblocks (XB) #0, #1, etc. and the logical addresses of the data (e.g., the address mapping relationships as illustrated with the arrows pointing toward the pages of the superblocks (XB) #0, #1, etc., with respect to the ranking of the multiple L2P table entries corresponding to the logical addresses in the temporary L2P address mapping table 116T), where any physical address among the multiple physical addresses may have a similar or the same format as that of the embodiment shown in FIG. 4.

Before performing the set of table-related processing operations with respect to the aforementioned at least one active block (e.g., the first active block) such as any superblock (XB) among the superblocks (XB) #0, #1, etc., during writing the data into the aforementioned any superblock (XB), the memory controller 110 may further write the number of valid pages (e.g., the pages storing valid data) among all pages of the aforementioned any superblock (XB) into the temporary valid page count table 116VP to be a valid page count of the aforementioned any superblock (XB), and more particularly, update the valid page count (e.g., the number of valid pages) of the aforementioned any superblock (XB) in real time, for example, at any moment when the valid page count changes. In addition, the operations performed with respect to the superblock (XB) #0 by the memory controller 110 can be taken as an example of the operations performed with respect to the aforementioned any superblock (XB) by the memory controller 110. For brevity, similar descriptions for this embodiment are not repeated in detail here.

According to some embodiments, the memory controller 110 may receive a first command (e.g., an unmap command, a trim command or an erase command) from the host device 50 through the transmission interface circuit 118 of the memory controller 110, where the first command may indicate that first partial storage space corresponding to a first logical address range will not be used by the host device 50. For example, the first command may carry first information related to the first logical address range, and the first information may comprise at least one first logical address (e.g., one or more first logical addresses) such as a first beginning logical address (e.g., a logical block address (LBA)), and more particularly, further comprise a first length, for indicating the first logical address range, where the first partial storage space may correspond to the first logical address range, but the present invention is not limited thereto. According to some embodiments, the command format of the first command and/or the first information carried by the first command may vary.

FIGS. 6A-6F illustrate a first entry processing operation, a second entry processing operation, a third entry processing operation, a fourth entry processing operation, a fifth entry processing operation and a sixth entry processing operation of a loop-based unmapping control scheme according to an embodiment of the present invention, respectively. For example, the memory controller 110 may operate according to the loop-based unmapping control scheme to process all L2P table entries in the temporary L2P address mapping table 116T in an entry-by-entry manner, but the present invention is not limited thereto. In addition, the memory controller 110 (e.g., the microprocessor 112) may execute a loop to process the L2P table entries in the temporary L2P address mapping table 116T. In each iteration of the loop, the memory controller 110 may process one L2P table entry among the L2P table entries in the temporary L2P address mapping table 116T, and change (e.g., decrease) the valid page count of a certain superblock among the superblocks (XB) #0, #1, etc. in the valid page count table 116VP.

Figure 6A:
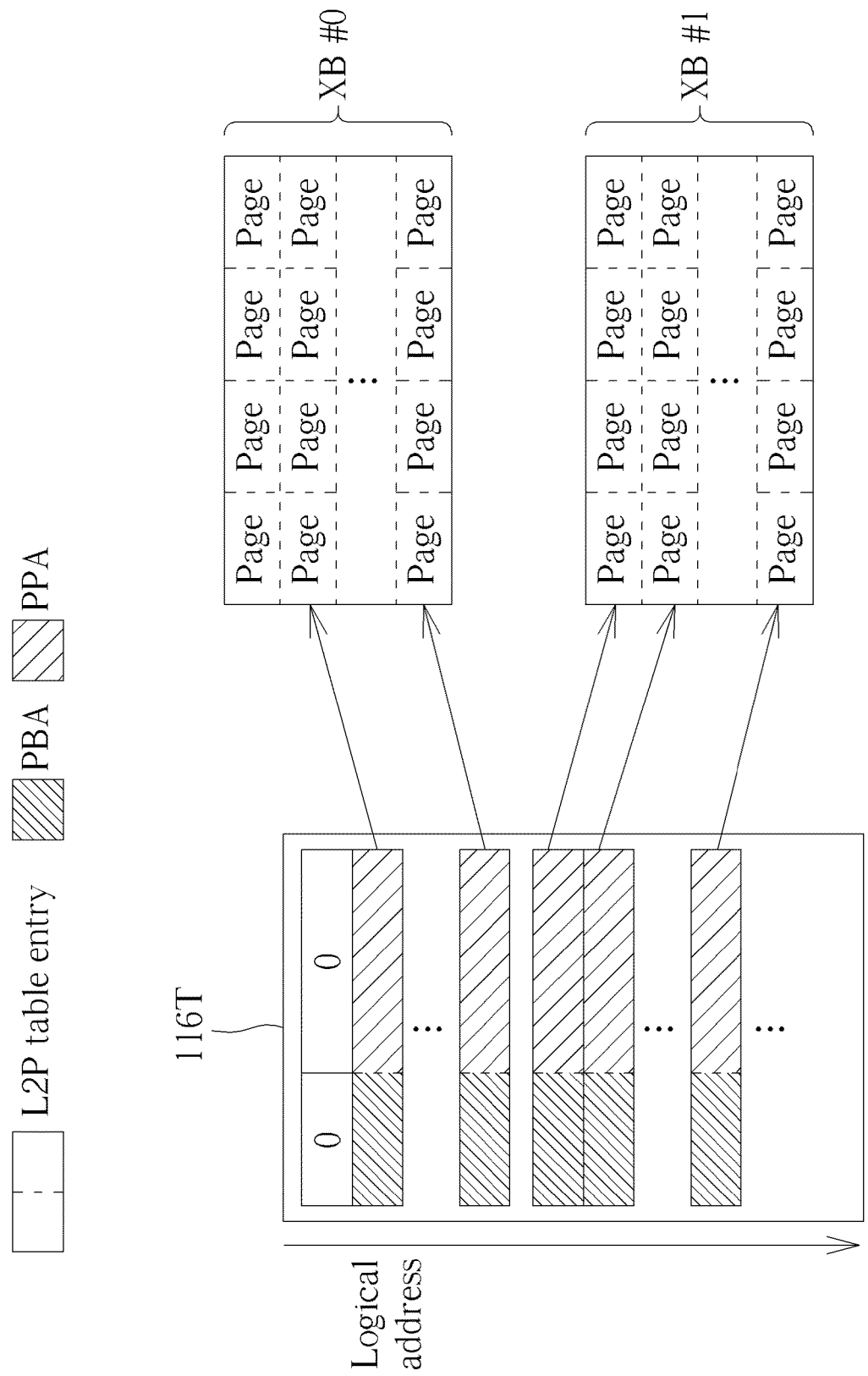
FIG. 6A illustrates a first entry processing operation of a loop-based unmapping control scheme according to an embodiment of the present invention.
Figure 6B:
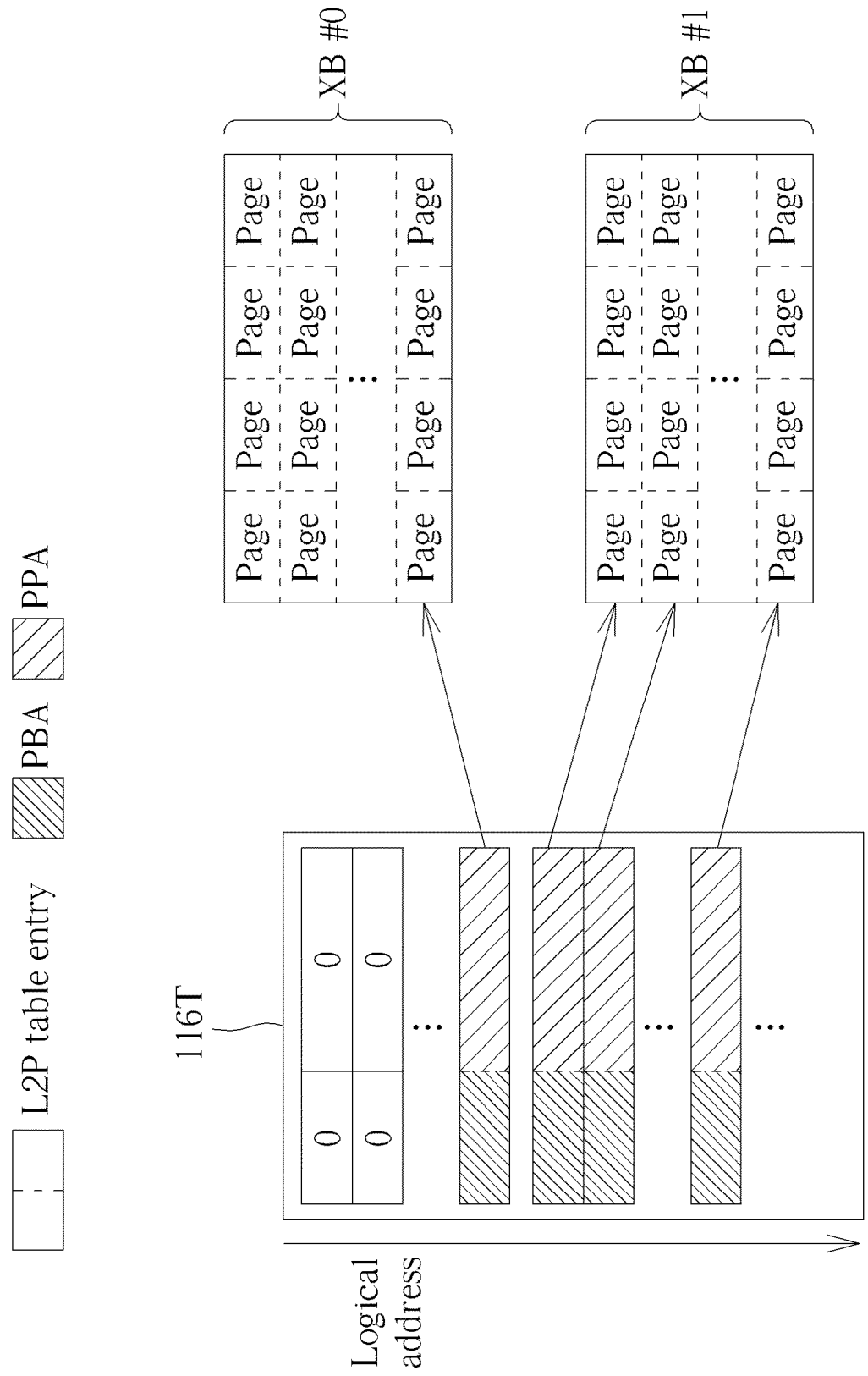
FIG. 6B illustrates a second entry processing operation of the loop-based unmapping control scheme according to the embodiment shown in FIG. 6A.
Figure 6C:
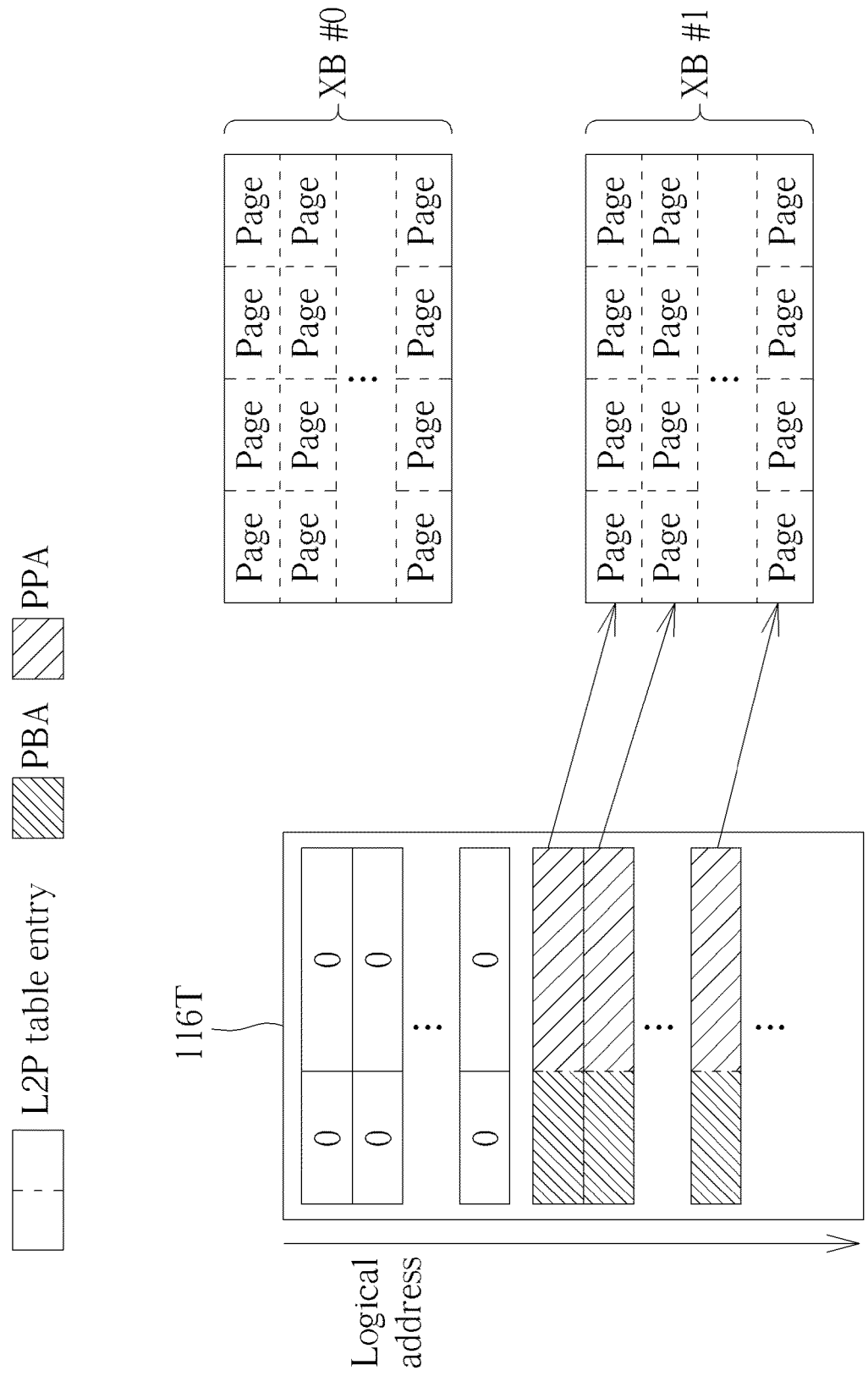
FIG. 6C illustrates a third entry processing operation of the loop-based unmapping control scheme according to the embodiment shown in FIG. 6A.

For example, in the first entry processing operation shown in FIG. 6A, the memory device 100 (e.g., the memory controller 110) may fill one L2P table entry such as the uppermost L2P table entry with a first predetermined value such as zero (labeled "0" for brevity) to unmap the first row of pages in the superblock (XB) #0 (e.g., cancel or clear the associated address mapping relationship thereof), and more particularly, make all data in the first row of pages in the superblock (XB) #0 become invalid, where a first arrow originally pointing toward the first row of pages in the superblock (XB) #0 as shown in FIG. 5 has been deleted to indicate the operation of unmapping the first row of pages in the superblock (XB) #0; in the second entry processing operation shown in FIG. 6B, the memory device 100 (e.g., the memory controller 110) may fill one L2P table entry such as the next L2P table entry with the first predetermined value such as zero (labeled "0" for brevity) to unmap the second row of pages in the superblock (XB) #0 (e.g., cancel or clear the associated address mapping relationship thereof), and more particularly, make all data in the second row of pages in the superblock (XB) #0 become invalid, where a second arrow originally pointing toward the second row of pages in the superblock (XB) #0 as shown in FIG. 5 has been deleted to indicate the operation of unmapping the second row of pages in the superblock (XB) #0; and the rest can be deduced by analogy, for example, in the third entry processing operation shown in FIG. 6C, the memory device 100 (e.g., the memory controller 110) may fill one L2P table entry such as a subsequent last L2P table entry with the first predetermined value such as zero (labeled "0" for brevity) to unmap the last row of pages in the superblock (XB) #0 (e.g., cancel or clear the associated address mapping relationship thereof), and more particularly, make all data in the last row of pages in the superblock (XB) #0 become invalid, where another arrow originally pointing toward the last row of pages in the superblock (XB) #0 as shown in FIG. 5 has been deleted to indicate the operation of unmapping the last row of pages in the superblock (XB) #0.

Figure 6D:
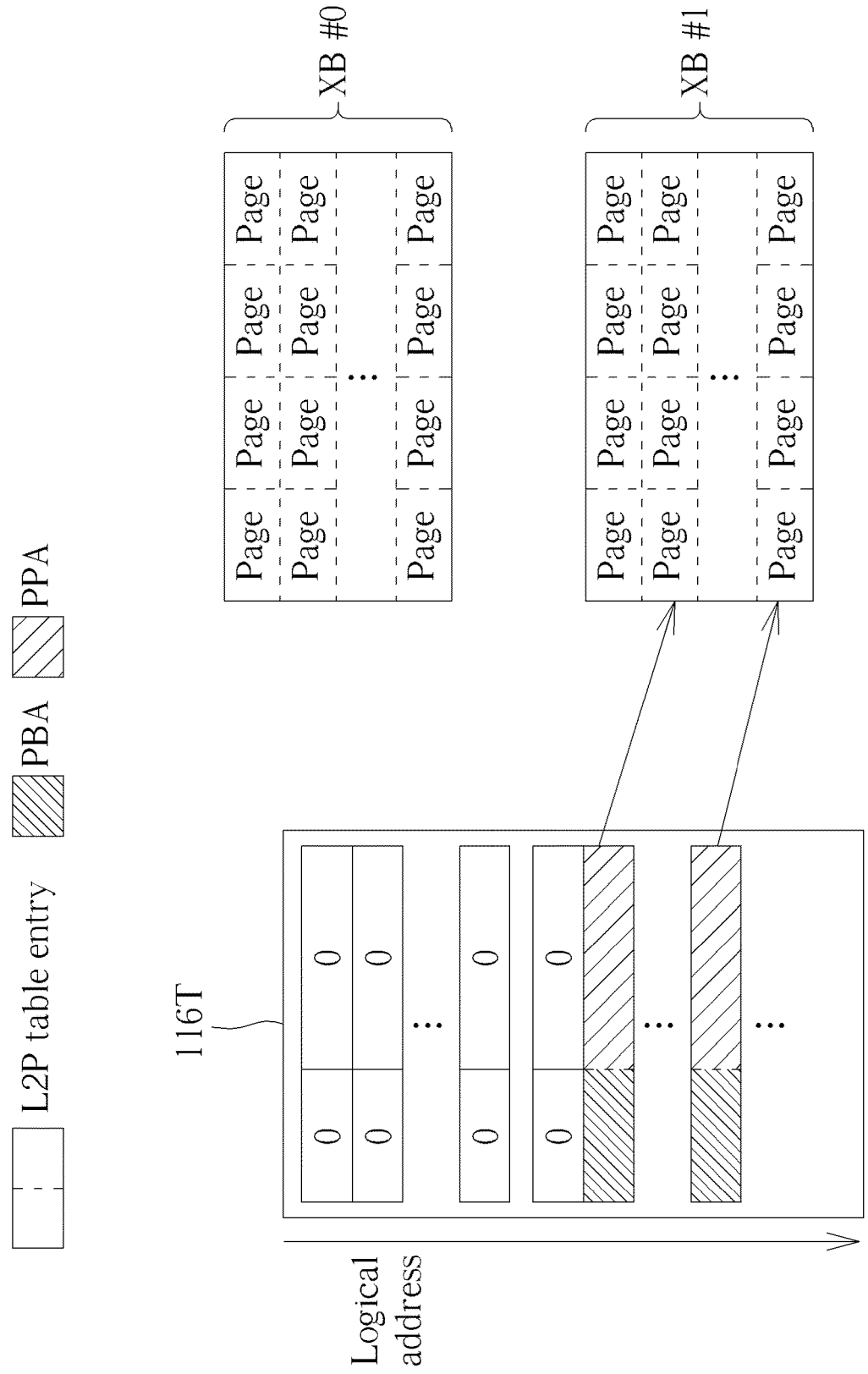
FIG. 6D illustrates a fourth entry processing operation of the loop-based unmapping control scheme according to the embodiment shown in FIG. 6A.
Figure 6E:
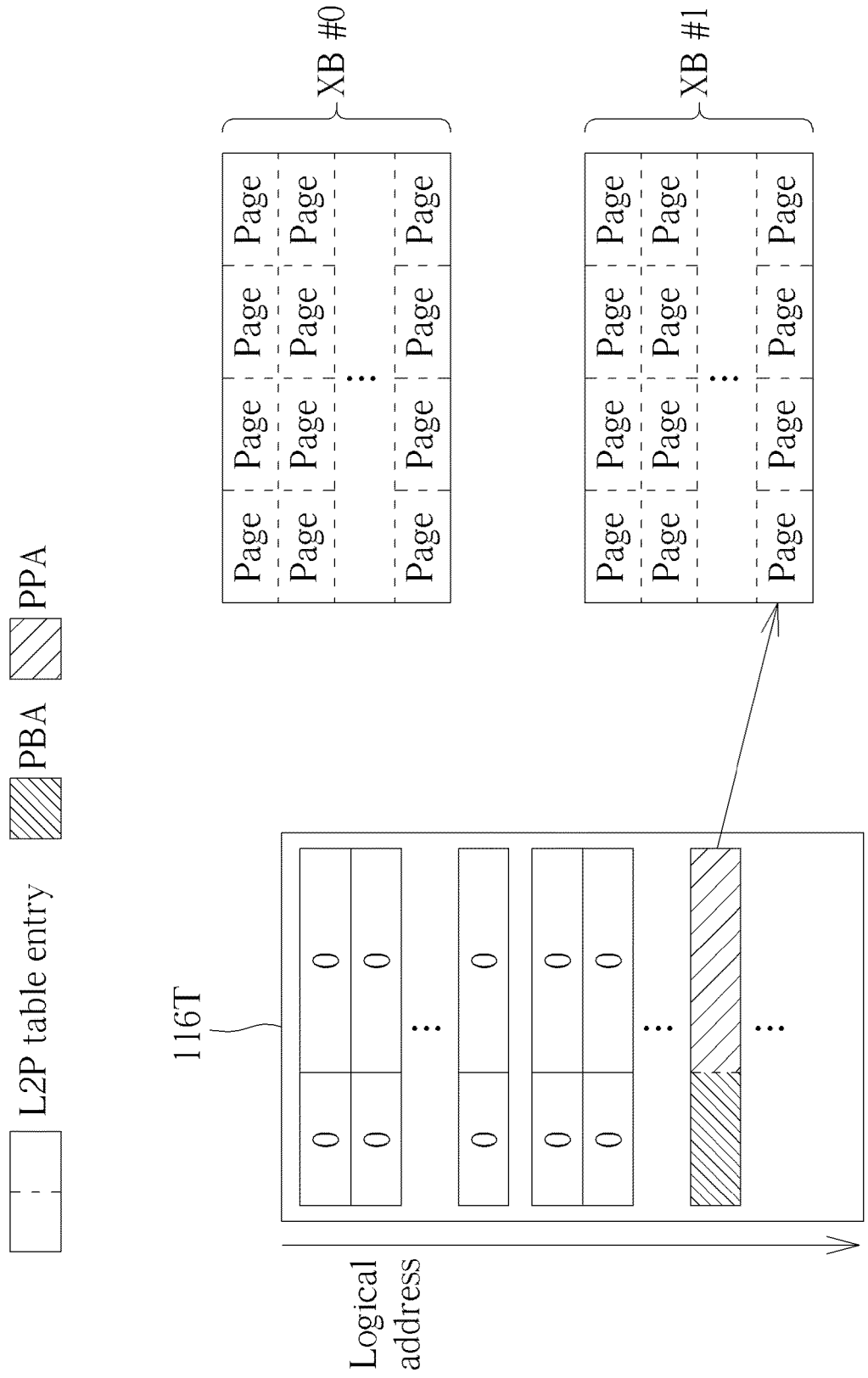
FIG. 6E illustrates a fifth entry processing operation of the loop-based unmapping control scheme according to the embodiment shown in FIG. 6A.
Figure 6F:
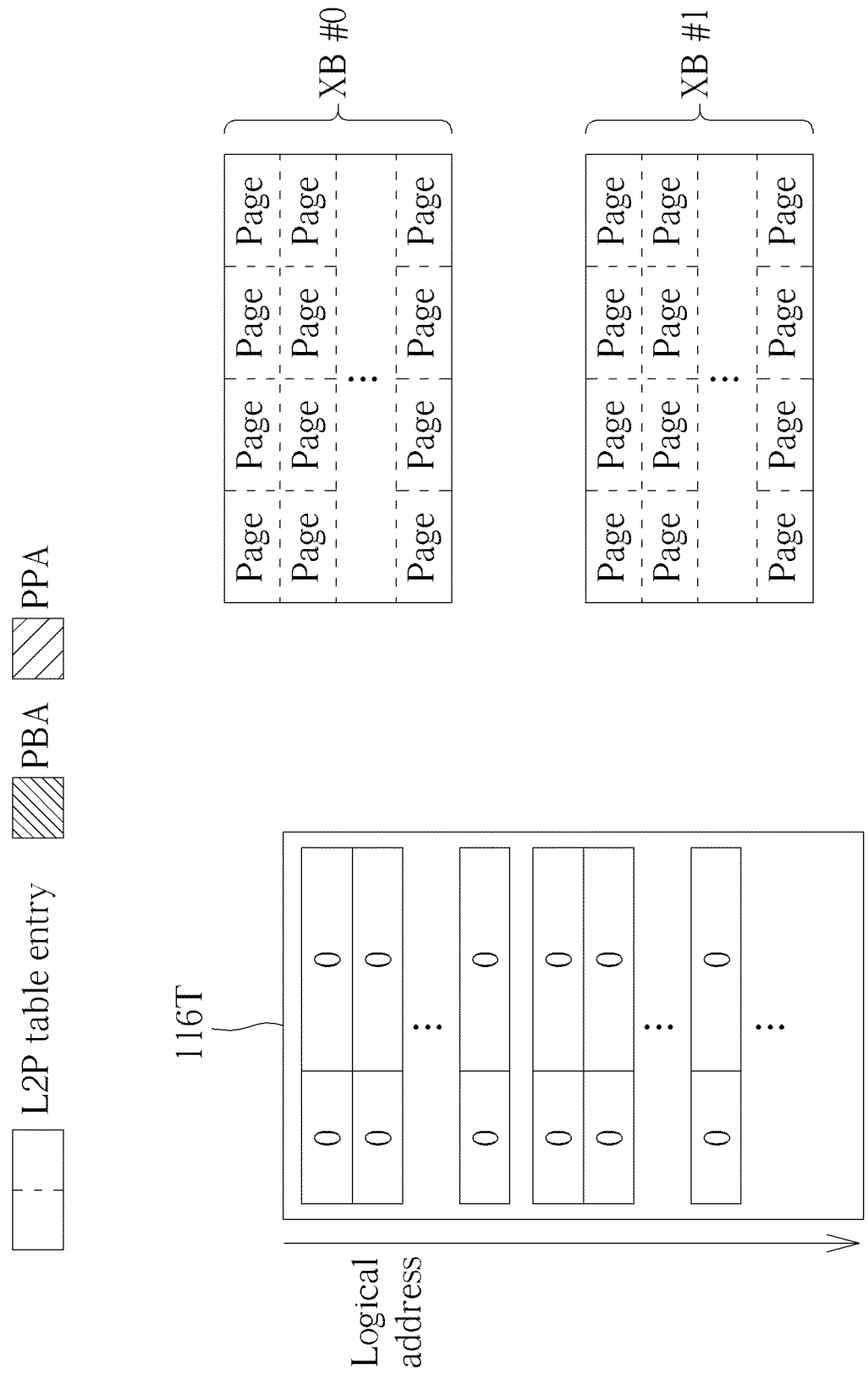
FIG. 6F illustrates a sixth entry processing operation of the loop-based unmapping control scheme according to the embodiment shown in FIG. 6A.

In addition, in the fourth entry processing operation shown in FIG. 6D, the memory device 100 (e.g., the memory controller 110) may fill one L2P table entry such as another subsequent L2P table entry (e.g., the L2P table entry immediately coming after the subsequent L2P table entry mentioned above) with the first predetermined value such as zero (labeled "0" for brevity) to unmap the first row of pages in the superblock (XB) #1 (e.g., cancel or clear the associated address mapping relationship thereof), and more particularly, make all data in the first row of pages in the superblock (XB) #1 become invalid, where a first arrow originally pointing toward the first row of pages in the superblock (XB) #1 as shown in FIG. 5 has been deleted to indicate the operation of unmapping the first row of pages in the superblock (XB) #1; in the fifth entry processing operation shown in FIG. 6E, the memory device 100 (e.g., the memory controller 110) may fill one L2P table entry such as yet another subsequent L2P table entry (e.g., the L2P table entry immediately coming after the aforementioned another (or the other) subsequent L2P table entry) with the first predetermined value such as zero (labeled "0" for brevity) to unmap the second row of pages in the superblock (XB) #1 (e.g., cancel or clear the associated address mapping relationship thereof), and more particularly, make all data in the second row of pages in the superblock (XB) #1 become invalid, where a second arrow originally pointing toward the second row of pages in the superblock (XB) #1 as shown in FIG. 5 has been deleted to indicate the operation of unmapping the second row of pages in the superblock (XB) #1; and the rest can be deduced by analogy, for example, in the sixth entry processing operation shown in FIG. 6F, the memory device 100 (e.g., the memory controller 110) may fill one L2P table entry such as still another subsequent L2P table entry with the first predetermined value such as zero (labeled "0" for brevity) to unmap the last row of pages in the superblock (XB) #1 (e.g., cancel or clear the associated address mapping relationship thereof), and more particularly, make all data in the last row of pages in the superblock (XB) #1 become invalid, where another arrow originally pointing toward the last row of pages in the superblock (XB) #1 as shown in FIG. 5 has been deleted to indicate the operation of unmapping the last row of pages in the superblock (XB) #1.

As shown in FIGS. 6A-6F, the memory controller 110 may operate according to the loop-based unmapping control scheme to process all L2P table entries in the temporary L2P address mapping table 116T in the entry-by-entry manner to unmap the pages of the superblock (XB) #0, #1, etc. row by row, and more particularly, process one L2P table entry in the temporary L2P address mapping table 116T and chance the valid page count in the valid page count table 116VP in each iteration of the loop, but the present invention is not limited thereto. According to some embodiments, the memory controller 110 may process the L2P table entries in the temporary L2P address mapping table 116T more efficiently.

Figure 7:
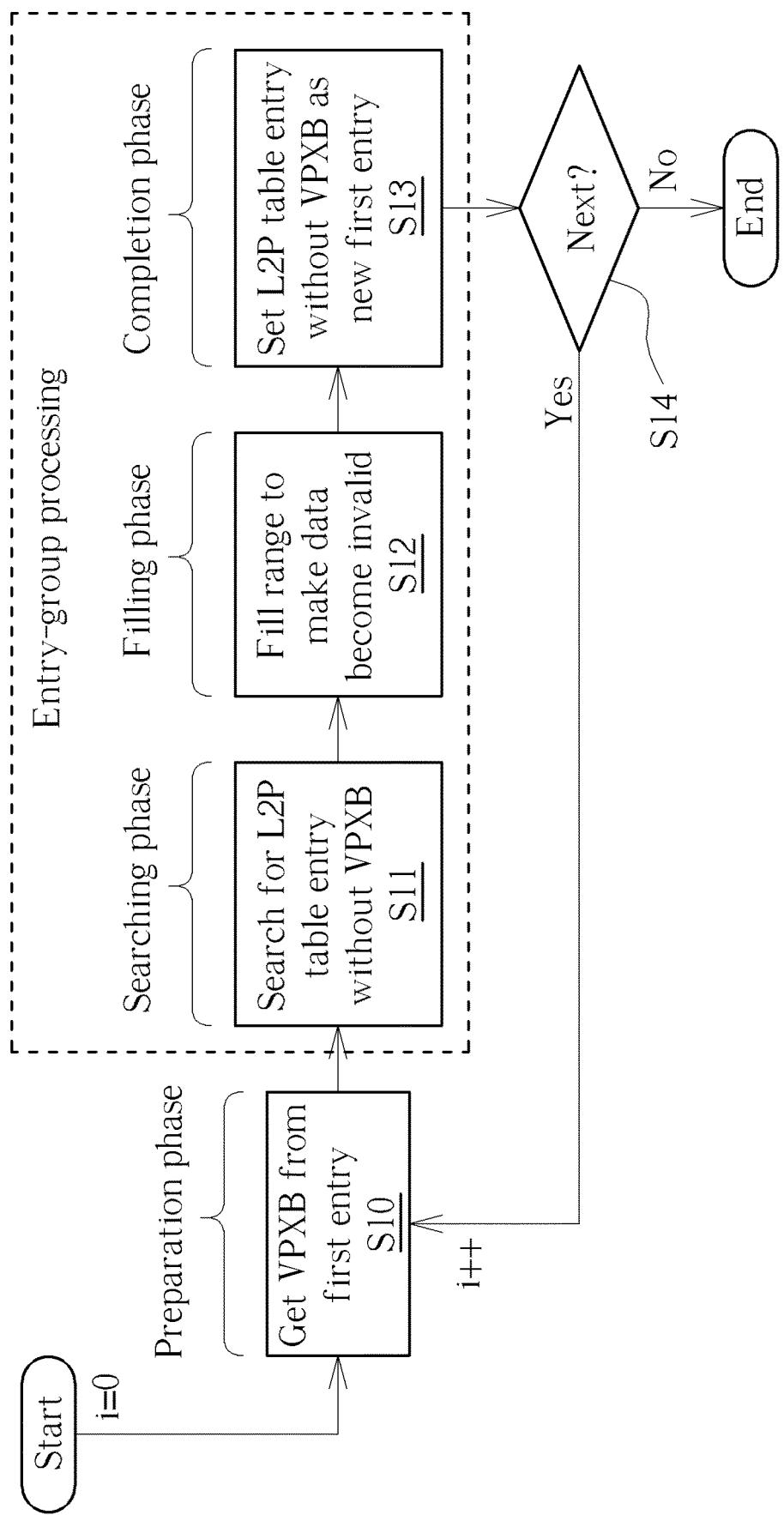
FIG. 7 illustrates a hybrid processing control scheme of a method for performing mapping table management of a memory device in a predetermined communications architecture with aid of table analysis according to an embodiment of the present invention.

FIG. 7 illustrates a hybrid processing control scheme of a method for performing mapping table management of a memory device in a predetermined communications architecture (e.g., a UFS communications architecture) with aid of table analysis according to an embodiment of the present invention. The method can be applied to the architecture shown in FIG. 1, for example, the electronic device 10, the host device 50, the memory device 100, and the memory controller 110, and more particularly, the components within the memory controller 110. In addition, the memory device 100 (e.g., the memory controller 110) that operates according to the method may execute a loop comprising Steps S10-S14 one or more times to perform entry-group processing (e.g., the operations of Steps S11, S12 and S13), in order to divide all L2P table entries in the temporary L2P address mapping table 116T into entry groups and process these L2P table entries in a group-by-group manner. For example, a loop index i may have a predetermined initial value such as zero (labeled "i=0" for brevity), and may increase with a predetermined increment such as one (labeled "i++" for brevity), where Steps S10-S13 may correspond to a preparation phase, a searching phase, a filling phase and a completion phase, respectively, and some steps such as Steps S11, S12 and S13 may be executed with a dedicated hardware circuit such as the table update circuit 114U, but the present invention is not limited thereto.

In Step S10, the memory device 100 (e.g., the memory controller 110) may prepare for processing the $i^{th}$ entry group GRP(i) corresponding to the index i in the temporary L2P address mapping table 116T, such as at least one L2P table entry L2PTE(i) (e.g., one or more L2P table entries {L2PTE(i)}) corresponding to the index i, and more particularly, get a PBA PBA(i) of a superblock XB(i) comprising valid pages {VP(i)} from a first L2P table entry L2PTE (i) in the temporary L2P address mapping table 116T (labeled "Get VPXB from first entry" for brevity). For better comprehension, the superblocks (XB) #0, #1, etc. and the pages thereof as shown in FIG. 5 can be taken as examples of the superblock XB(i) and the valid pages {VP(i)} thereof, respectively, but the present invention is not limited thereto. In addition, the first L2P table entry L2PTE(i) may carry a physical address {PBA(i), PPA(i)}, and the physical address {PBA(i), PPA(i)} may comprise the PBA PBA(i) and a PPA PPA(i), where the PBA PBA(i) and the PPA PPA(i) may be located in multiple higher bits (e.g., a set of consecutive bits comprising the MSB) and multiple lower bits (e.g., a set of consecutive bits comprising the LSB) of the physical address {PBA(i), PPA(i)}, respectively, but the present invention is not limited thereto.

In Step S11, the memory device 100 (e.g., the memory controller 110) may search for any L2P table entry carrying a different PBA (e.g., any PBA that is different from the PBA PBA(i) of the superblock XB(i)) in the temporary L2P address mapping table 116T, starting from the next L2P table entry (if it exists) of the first L2P table entry L2PTE(i) (labeled "Search for L2P table entry without VPXB" for brevity). For example, the aforementioned at least one L2P table entry L2PTE(i) may comprise X consecutive L2P table entries {L2PTE(i)} carrying the same PBA PBA(i), and the aforementioned any L2P table entry carrying the different PBA (e.g., the aforementioned any PBA that is different from the PBA PBA(i)) may represent the immediately found L2P table entry that does not carry the PBA PBA(i), such as the next L2P table entry coming after the X consecutive L2P table entries {L2PTE(i)}, but the present invention is not limited thereto. For another example, the aforementioned at least one L2P table entry L2PTE(i) may comprise a single L2P table entry L2PTE(i), and the aforementioned any L2P table entry carrying the different PBA (e.g., the aforementioned any PBA that is different from the PBA PBA(i)) may represent the immediately found L2P table entry that does not carry the PBA PBA(i), such as the next L2P table entry coming after the single L2P table entry L2PTE(i).

In Step S12, the memory device 100 (e.g., the memory controller 110) may change the aforementioned at least one L2P table entry L2PTE(i) (e.g., the one or more L2P table entries {L2PTE(i)}) corresponding to the index i, and more particularly, calculate a difference between a first location of the first L2P table entry L2PTE(i) and a second location of the aforementioned any L2P table entry carrying the different PBA in the temporary L2P address mapping table 116T in order to determine the range of the $i^{th}$ entry group GRP(i) (e.g., the aforementioned at least one L2P table entry L2PTE (i)) in the temporary L2P address mapping table 116T, and fill the range of the $i^{th}$ entry group GRP(i) (e.g., the aforementioned at least one L2P table entry L2PTE(i)) with the first predetermined value such as zero to make all data in the valid pages {VP(i)} of the superblock XB(i) corresponding to this range become invalid (labeled "Fill range to make data become invalid" for brevity), where the difference between the first location and the second location may indicate the size of this range.

For example, when the difference between the first location and the second location is equal to X, the memory controller 110 may replace the table contents in the X-entries range of the X consecutive L2P table entries {L2PTE(i)} with the bit 0. As a result, all bits in the X-entries range may become the bit 0. For another example, when the difference between the first location and the second location is equal to one, the memory controller 110 may replace the table contents in the one-entry range of the single L2P table entry L2PTE(i) with the bit 0. As a result, all bits in the one-entry range may become the bit 0.

In Step S13, the memory device 100 (e.g., the memory controller 110) may set the aforementioned any L2P table entry mentioned in Step S11, such as the L2P table entry carrying the aforementioned any PBA that is different from the PBA PBA(i), to be a new first L2P table entry L2PTE (i+1) (labeled "Set L2P table entry without VPXB as new first entry" for brevity).

In Step S14, the memory device 100 (e.g., the memory controller 110) may determine to perform a next operation, for example, according to whether there is any next entry group GRP(i+1) to be processed (e.g., whether the aforementioned any L2P table entry mentioned in Step S11 is found). If Yes (e.g., the aforementioned any L2P table entry mentioned in Step S11 is found), Step S10 is entered; if No (e.g., the aforementioned any L2P table entry mentioned in Step S11 is not found), the working flow shown in FIG. 7 comes to the end.

For example, in Step S11, the memory controller 110 (e.g., the dedicated hardware circuit such as the table update circuit 114U) may search for the aforementioned any L2P table entry within the temporary L2P address mapping table 116T without exceeding the whole range of the temporary L2P address mapping table 116T, and use a register circuit (e.g., a register therein) within the memory controller 110 to indicate whether the aforementioned any L2P table entry is found, and more particularly, set a register value stored by the register circuit to be a default register value such as zero before starting searching for the aforementioned any L2P table entry, and set the register value to be a first register value such as one if the aforementioned any L2P table entry is found, but the present invention is not limited thereto. After performing the operation of Step S11, if the register value is equal to the default register value such as zero, which may indicate that a remaining part within the whole range of the temporary L2P address mapping table 116T have just been fully searched in Step S11, the memory controller 110 may determine the range mentioned in Step S12 to be equal to the remaining part (e.g., the $i^{th}$ entry group GRP(i) such as the aforementioned at least one L2P table entry L2PTE(i) may occupy the remaining part) to perform the operation of Step S12 (e.g., fill the range with the first predetermined value such as zero), and skip Step S13 to jump to Step S14. In response to the register value being equal to the default register value such as zero, the memory controller 110 may obtain the determination result "No" in Step S14.

Based on the hybrid processing control scheme shown in FIG. 7, in a situation where the valid pages {VP(0)} of the superblock XB(0), the valid pages {VP(1)} of the superblock XB(1), etc. are arranged to store sequential data, respectively, the memory device 100 (e.g., the memory controller 110) can collect multiple sets of consecutive L2P table entries {{L2PTE(0)}, {L2PTE(1)}, ... } carrying the PBAs {PBA(0), PBA(1), ... } into the entry groups {GRP(0), GRP(1), ... }, respectively, and process the entry groups {GRP(0), GRP(1), ... } (e.g., the multiple sets of consecutive L2P table entries) in the group-by-group manner to enhance overall performance, having no need to process all L2P table entries in the temporary L2P address mapping table 116T in the entry-by-entry manner, where any set of consecutive L2P table entries {{L2PTE(i)} among the multiple sets of consecutive L2P table entries {{L2PTE(0)}, {L2PTE(1)}, ... } should carry the same PBA PBA(i). As a result, the memory device 100 (e.g., the memory controller 110) can complete updating the temporary L2P address mapping table 116T immediately without being hindered by any entry processing operation such as that shown in FIGS. 6A-6F, and update the global L2P address mapping table 120T in the NV memory 120 according to the temporary L2P address mapping table 116T in time, for clearing the associated L2P address mapping relationships originally indicated by the old L2P table entries being updated. For example, the memory device 100 (e.g., the memory controller 110) may execute the working flow shown in FIG. 7 in response to the aforementioned first command from the host device 50, and operate according the next command from the host device 50 without any delay. In some examples, at least one portion of pages (e.g., a portion of pages or all pages) among the valid pages {VP(0)} of the superblock XB(0), the valid pages {VP(1)} of the superblock XB(1), etc. may be arranged to store non-sequential data, and the memory device 100 (e.g., the memory controller 110) may also execute the working flow shown in FIG. 7 in response to the aforementioned first command, and operate according the next command from the host device 50 without significant delay. Therefore, the method can guarantee that the memory device 100 (e.g., the memory controller 110) can operate properly in various situations.

For better comprehension, the method may be illustrated with the working flow shown in FIG. 7, but the present invention is not limited thereto. According to some embodiments, one or more steps may be added, deleted, or changed in the working flow shown in FIG. 7.

According to some embodiments, the memory controller 110 may be arranged to extract a set of consecutive bits (e.g., the multiple higher bits such as the set of consecutive bits comprising the MSB) from all bits of the physical address {PBA(i), PPA(i)} to be the PBA PBA(i) in Step S10. For brevity, similar descriptions for these embodiments are not repeated in detail here.

Figure 8A:
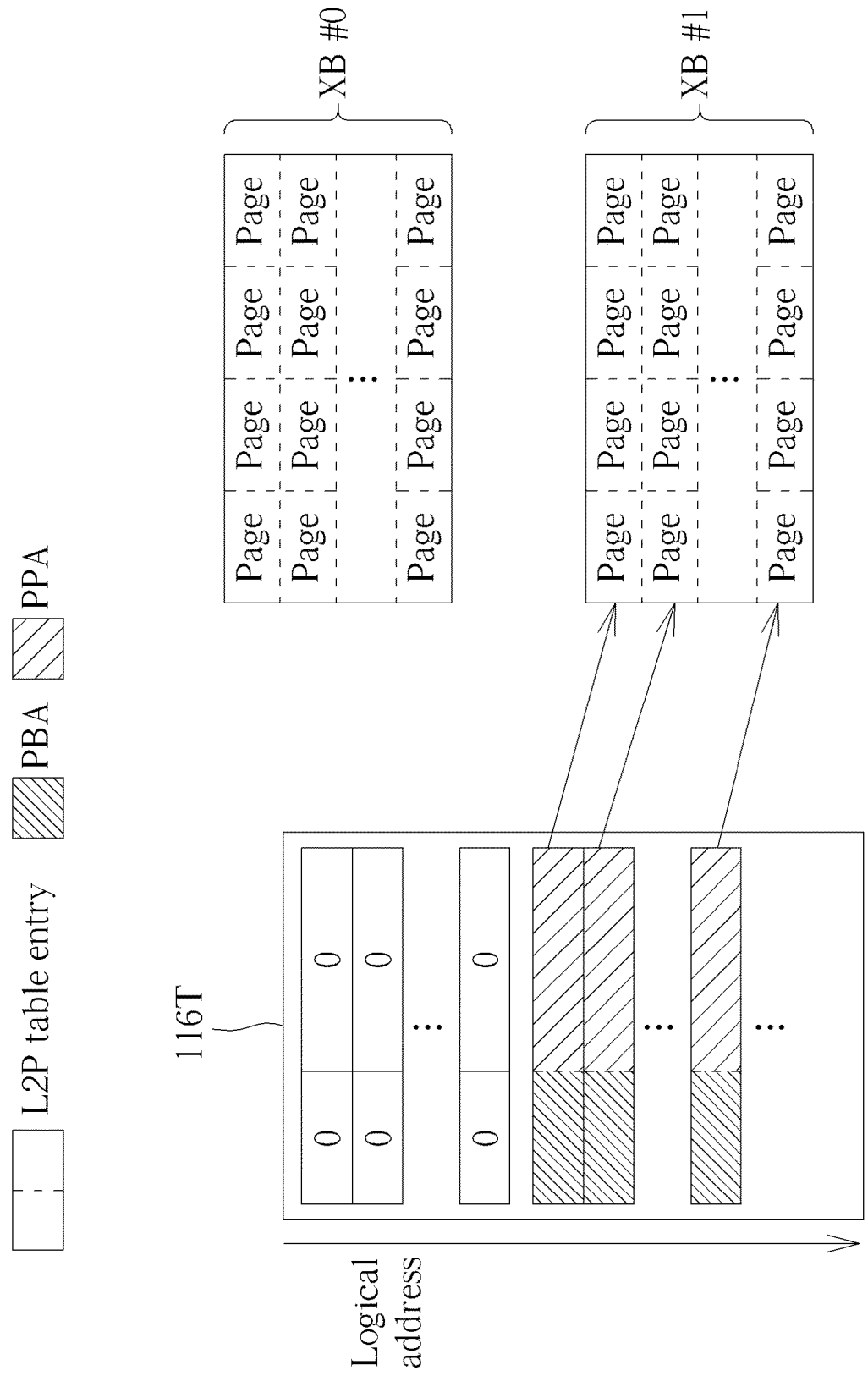
FIG. 8A illustrates a first entry-group processing operation of a search-based unmapping control scheme of the method according to an embodiment of the present invention.
Figure 8B:
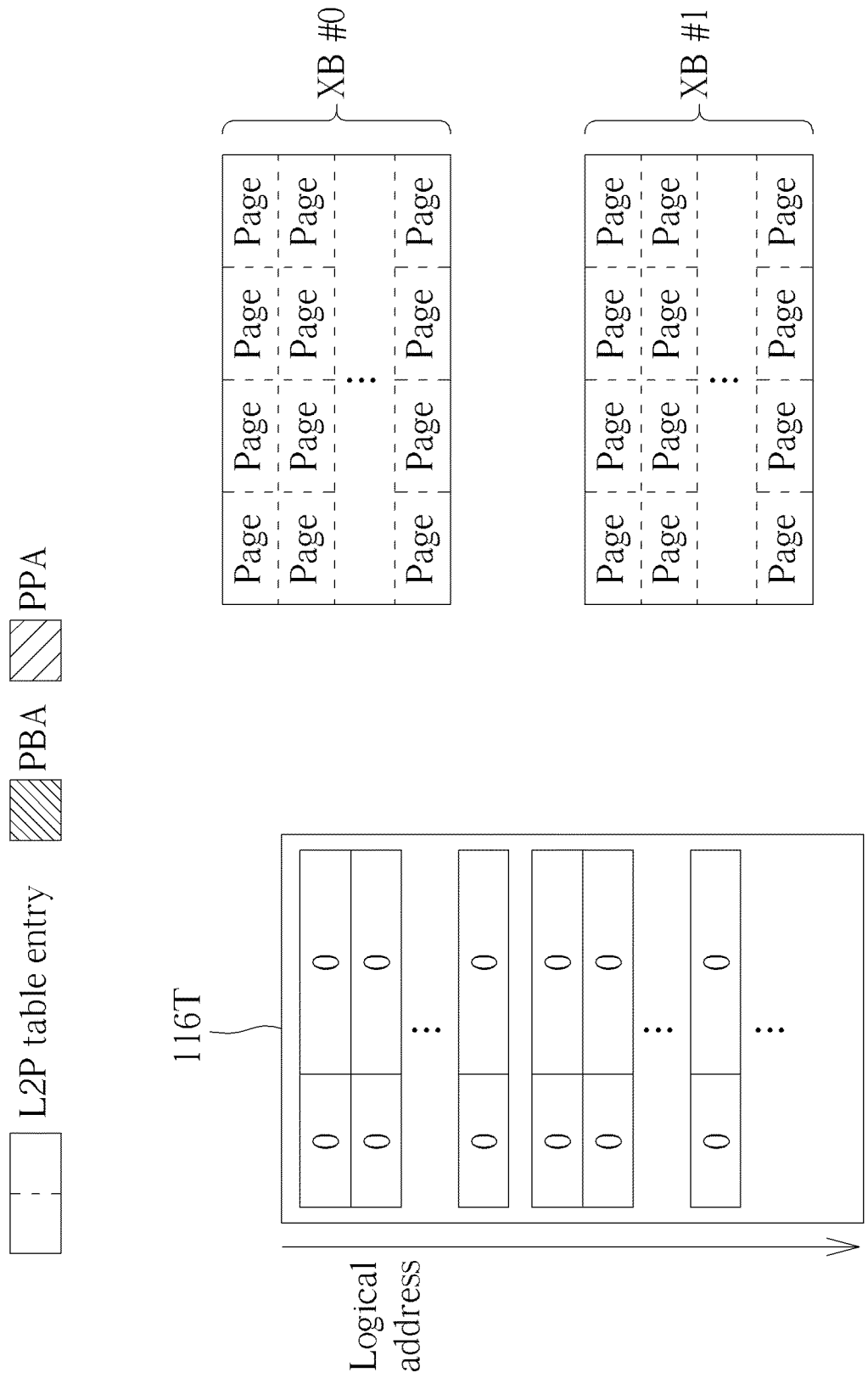
FIG. 8B illustrates a second entry-group processing operation of the search-based unmapping control scheme of the method according to the embodiment shown in FIG. 8A.

FIGS. 8A and 8B illustrate a first entry-group processing operation and a second entry-group processing operation of a search-based unmapping control scheme of the method according to an embodiment of the present invention, respectively. During executing the working flow shown in FIG. 7, the memory controller 110 may process the $i^{th}$ entry group GRP(i) among multiple entry groups {GRP(i)} in the temporary L2P address mapping table 116T, and change (e.g., decrease) the valid page count of a certain superblock among the superblocks (XB) #0, #1, etc. in the valid page count table 116VP correspondingly.

For example, in the first entry-group processing operation, the memory device 100 (e.g., the memory controller 110) may fill one entry group such as the entry group GRP(0) with the first predetermined value such as zero (labeled "0" for brevity) to unmap multiple rows of pages (e.g., the first row of pages, the second row of pages, . . . and the last row of pages) in the superblock (XB) #0 (e.g., cancel or clear the associated address mapping relationship thereof), and more particularly, make all data in the multiple rows of pages in the superblock (XB) #0 become invalid, where multiple arrows originally pointing toward the multiple rows of pages in the superblock (XB) #0 as shown in FIG. 5 have been deleted to indicate the operation of unmapping the multiple rows of pages in the superblock (XB) #0; in the second entry-group processing operation, the memory device 100 (e.g., the memory controller 110) may fill one entry group such as the entry group GRP(1) with the first predetermined value such as zero (labeled "0" for brevity) to unmap multiple rows of pages (e.g., the first row of pages, the second row of pages, . . . and the last row of pages) in the superblock (XB) #1 (e.g., cancel or clear the associated address mapping relationship thereof), and more particularly, make all data in the multiple rows of pages in the superblock (XB) #1 become invalid, where multiple arrows originally pointing toward the multiple rows of pages in the superblock (XB) #1 as shown in FIG. 5 have been deleted to indicate the operation of unmapping the multiple rows of pages in the superblock (XB) #1; and the rest can be deduced by analogy.

As shown in FIGS. 8A and 8B, the memory controller 110 may operate according to the search-based unmapping control scheme to process all L2P table entries in the temporary L2P address mapping table 116T in the group-by-group manner to unmap the pages of the superblock (XB) #0, #1, etc. block by block, and more particularly, perform the entry-group processing shown in FIG. 7 to process one entry group in the temporary L2P address mapping table 116T and chance (e.g., decrease) the valid page count in the valid page count table 116VP with the corresponding entry group size efficiently. For brevity, similar descriptions for this embodiment are not repeated in detail here.

Figure 9:
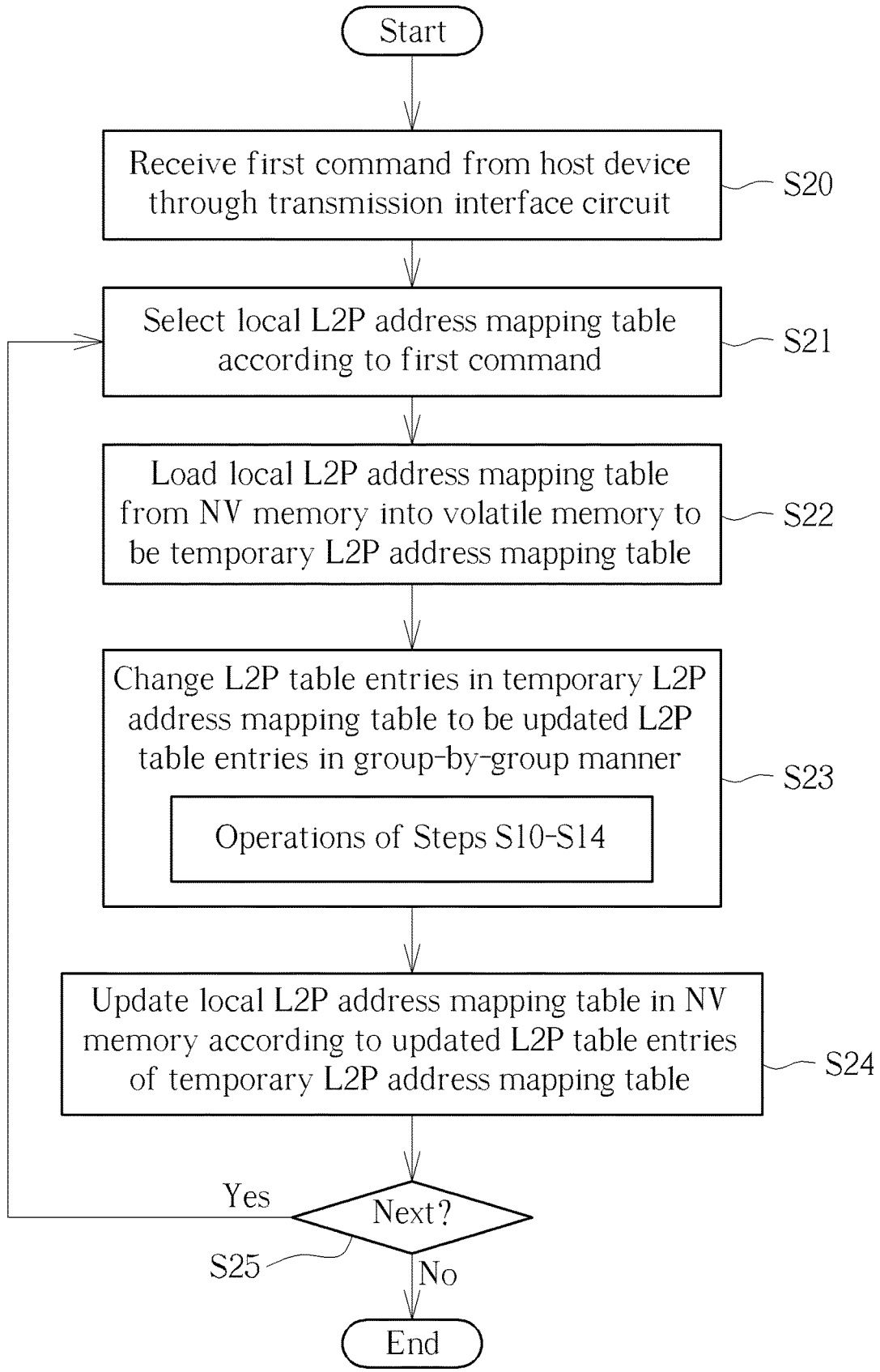
FIG. 9 illustrates a working flow of the method according to an embodiment of the present invention.

FIG. 9 illustrates a working flow of the method according to an embodiment of the present invention. The memory controller 110 may use the plurality of local L2P address mapping tables to manage the relationships between the physical addresses and the logical addresses, such as the physical addresses indicating the locations where the host-write data are stored in the NV memory 120 and the logical addresses at which the host-write data are written by the host device 50. For example, the plurality of local L2P address mapping tables may be implemented as a series of local L2P address mapping tables {L2PT(1), L2PT(2), . . . , L2PT(X)} respectively corresponding to a series of logical address ranges {ADDR(1), ADDR(2), . . . , ADDR(X)}, and the series of logical address ranges {ADDR(1), ADDR(2), . . . , ADDR(X)} may be implemented as a series of consecutive ranges of a series of consecutive logical addresses {ADD(0), ADD(1), . . . , ADD((X*Y)–1)}, such as the ranges of the X intervals [ADD(0), ADD(Y–1)], [ADD(Y), ADD((2*Y)–1)], . . . and [ADD((X–1)*Y), ADD((X*Y)–1)].

In Step S20, the memory device 100 (e.g., the memory controller 110) may receive the first command (e.g., the unmap command, the trim command or the erase command) from the host device 50 through the transmission interface circuit 118 of the memory controller 110, where the first command may indicate that the first partial storage space corresponding to the first logical address range will not be used by the host device 50. For example, in response to the first command, the memory device 100 (e.g., the memory controller 110) may perform the operations of Steps S21-S25.

In Step S21, the memory device 100 (e.g., the memory controller 110) may select a local L2P address mapping table L2PT(x) corresponding to a logical address range ADDR(x) from the plurality of local L2P address mapping tables such as the series of local L2P address mapping tables {L2PT(1), L2PT(2), . . . , L2PT(X)} according to the first command, for being processed in the loop comprising Steps S21-S25, where "x" may represent a positive integer in the interval [1, X]. As the first command may carry the first information related to the first logical address range, the memory controller 110 may determine the logical address range ADDR (x) according to the first logical address range indicated by the first information (e.g., the first beginning logical address and the first length).

The logical address range ADDR(x) may comprise at least one portion (e.g., a portion or all) of the first logical address range, and the aforementioned at least one portion of the first logical address range may fall within the logical address range ADDR(x). For example, the logical address range ADDR(x) may comprise the whole of the first logical address range, and the first logical address range may fall within the logical address range ADDR(x), where the loop comprising Steps S21-S25 may be executed once, but the present invention is not limited thereto. For another example, the logical address range ADDR(x) may comprise a portion of the first logical address range, and the portion of the first logical address range may fall within the logical address range ADDR(x), where the loop comprising Steps S21-S25 may be executed more than once to switch among different local L2P address mapping tables {L2PT(x)} respectively corresponding to different logical address ranges {ADDR(x)} (e.g., the logical address ranges {ADDR (x)} covering multiple portions of the first logical address range, respectively).

In Step S22, the memory device 100 (e.g., the memory controller 110) may load the local L2P address mapping table L2PT(x) corresponding to the logical address range ADDR(x) from the NV memory 120 into a volatile memory within the memory controller 110, such as the RAM 116, to be the temporary L2P address mapping table 116T, where the local L2P address mapping table L2PT(x) is one of the plurality of local L2P address mapping tables (e.g., the series of local L2P address mapping tables {L2PT(1), L2PT(2), ..., L2PT(X)}) within the global L2P address mapping table 120T.

In Step S23, the memory device 100 (e.g., the memory controller 110) may change multiple L2P table entries in the temporary L2P address mapping table 116T to be multiple updated L2P table entries in the group-by-group manner, rather than the entry-by-entry manner. For better comprehension, the multiple L2P table entries and the multiple updated L2P table entries may represent the L2P table entries in the temporary L2P address mapping table 116T shown in FIG. 5 and the L2P table entries in the temporary L2P address mapping table 116T shown in FIG. 8B, respectively, but the present invention is not limited thereto. In addition, the memory controller 110) may change the multiple L2P table entries in the temporary L2P address mapping table 116T with the dedicated hardware circuit such as the table update circuit 114U to be the multiple updated L2P table entries in the group-by-group manner.

For example, the operation of Step S23 may comprise the working flow shown in FIG. 7, such as the operations of Steps S10-S14 thereof, where Step S23 may comprise multiple sub-steps such as Steps S10-S14, but the present invention is not limited thereto. More particularly, the memory controller 110 may obtain a first PBA such as the PBA PBA(i) from the first L2P table entry L2PTE(i) in the temporary L2P address mapping table 116T to prepare for processing a first entry group such as the $i^{th}$ entry group GRP(i) in the temporary L2P address mapping table 116T, where the first entry group such as the $i^{th}$ entry group GRP(i) may comprise the aforementioned at least one L2P table entry L2PTE(i), and the aforementioned at least one L2P table entry L2PTE(i) may comprise the first L2P table entry L2PTE(i). For example, the first L2P table entry L2PTE(i) may be the beginning L2P table entry among the aforementioned at least one L2P table entry L2PTE(i). In addition, the memory controller 110 may search for the aforementioned any L2P table entry carrying the different PBA in the temporary L2P address mapping table 116T, where the different PBA may represent any PBA that is different from the first PBA, such as the aforementioned any PBA that is different from the PBA PBA(i). Additionally, the memory controller 110 may determine a first range of the first entry group (e.g., the $i^{th}$ entry group GRP(i)) in the temporary L2P address mapping table 116T, such as the range mentioned in Step S12, and fill the first range of the first entry group with the first predetermined value such as zero, but the present invention is not limited thereto. According to some embodiments, the first predetermined value may vary. For example, the first predetermined value may be equal to any of some other values that are different from zero.

In Step S24, the memory device 100 (e.g., the memory controller 110) may update the local L2P address mapping table L2PT(x) in the NV memory 120 according to the multiple updated L2P table entries of the temporary L2P address mapping table 116T, for unmapping at least one portion of pages among all pages of at least one block of the plurality of blocks, where the first partial storage space may comprise the aforementioned at least one portion of pages. For example, the aforementioned at least one block may comprise at least one superblock among the superblocks (XB) #0, #1, etc., and more particularly, may comprise the blocks (BLK) within the aforementioned at least one superblock, but the present invention is not limited thereto. According to some embodiments, the aforementioned at least one block may comprise at least one physical block, such as at least one of the blocks (BLK) #0, #1, etc. in any plane among the multiple planes (e.g., the planes #0 and #1) of the aforementioned any NV memory element 122-n (e.g., the aforementioned any chip among the chips #0 and #1 or the aforementioned any die among the dies #0 and #1).

In Step S25, the memory device 100 (e.g., the memory controller 110) may determine whether to perform a next operation, for example, according to whether there is another local L2P address mapping table (e.g., a next local L2P address mapping table) among the series of local L2P address mapping tables {L2PT(1), L2PT(2), ..., L2PT(X)} that needs to be processed (labeled "Next" for brevity). If Yes (e.g., there is the other local L2P address mapping table that needs to be processed), Step S21 is entered; if No (e.g., there is no more local L2P address mapping table that needs to be processed), the working flow shown in FIG. 9 comes to the end.

For better comprehension, the method may be illustrated with the working flow shown in FIG. 9, but the present invention is not limited thereto. According to some embodiments, one or more steps may be added, deleted, or changed in the working flow shown in FIG. 9.

According to some embodiments, taking the $i^{th}$ entry group GRP(i) as an example of the first entry group, each L2P table entry L2PTE(i) among the aforementioned at least one L2P table entry L2PTE(i) of the $i^{th}$ entry group GRP(i) may be arranged to carry a physical address (e.g., the physical address {PBA(i), PPA(i)}), and the physical address may comprise a PBA and a PPA. The memory controller 110 may fill each L2P table entry L2PTE(i), such as each L2P table entry L2PTE(i) carrying the PBA and the PPA, with the first predetermined value. For example, the memory controller 110 may fill a plurality of bits in each L2P table entry L2PTE(i) with a first predetermined bit (e.g., the bit 0), respectively. For brevity, similar descriptions for these embodiments are not repeated in detail here.

According to some embodiments, the memory controller 110 may unmap a portion of pages in a block according to the method (e.g., at least one control scheme thereof, such as the hybrid processing control scheme shown in FIG. 7 and the search-based unmapping control scheme shown in FIGS. 8A and 8B), without unmapping some valid pages, and may update the latest valid page count of this block into the valid page count tables 116VP and 120VP, where the latest valid page count of this block may be a non-zero value such as a positive value. In addition, the memory controller 110 may perform the GC operations, and more particularly, read all valid data from the valid pages of this block, write the valid data of this block into a blank block (e.g., an erased block), and erase the block to release more storage space for further use. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing mapping table management of a memory device in a predetermined communications architecture with aid of table analysis, the method being applied to a memory controller of the memory device, the memory device comprising the memory controller and a non-volatile (NV) memory, the NV memory comprising at least one NV memory element, the at least one NV memory element comprising a plurality of blocks, the method comprising:

utilizing the memory controller to receive a first command from a host device through a transmission interface circuit of the memory controller, wherein the first command indicates that first partial storage space corresponding to a first logical address range will not be used by the host device, the first command carries first information related to the first logical address range, and the first information comprises at least one first beginning logical address and a first length for indicating the first logical address range; and in response to the first command, loading a local logical-to-physical (L2P) address mapping table from the NV memory into a volatile memory within the memory controller to be a temporary L2P address mapping table, determining a first entry group as addresses within the first logical address range starting from the first logical address and corresponding to a first physical block, setting a next sequential L2P table entry in the temporary L2P address mapping table after the first entry group as a second logical address, determining a second entry group as addresses within the first logical address range starting from the second logical address and corresponding to a second physical block, changing multiple L2P table entries in the temporary L2P address mapping table to be multiple updated L2P table entries in a group-by-group manner corresponding to the first entry group and the second entry group, rather than an entry-by-entry manner, and updating the local L2P address mapping table in the NV memory according to the multiple updated L2P table entries of the temporary L2P address mapping table corresponding to the first entry group and the second entry group, for unmapping at least one portion of pages among all pages of at least one block of the plurality of blocks, wherein the first partial storage space comprises the at least one portion of pages.

2. The method of claim 1, wherein the NV memory is arranged to store a global L2P address mapping table, and the global L2P address mapping table comprises a plurality of local L2P address mapping tables, wherein the local L2P address mapping table is one of the plurality of local L2P address mapping tables.

3. The method of claim 1, wherein changing the multiple L2P table entries in the temporary L2P address mapping table to be the multiple updated L2P table entries in the group-by-group manner further comprises:

changing the multiple L2P table entries in the temporary L2P address mapping table with a dedicated hardware circuit within the memory controller to be the multiple updated L2P table entries in the group-by-group manner.

4. The method of claim 1, wherein changing the multiple L2P table entries in the temporary L2P address mapping table to be the multiple updated L2P table entries in the group-by-group manner further comprises:

obtaining a first physical block address (PBA) of the first physical block from a first L2P table entry corresponding to the first logical address in the temporary L2P address mapping table to prepare for processing the first entry group in the temporary L2P address mapping table, wherein the first entry group comprises at least one L2P table entry, and the at least one L2P table entry comprises the first L2P table entry;

searching for any L2P table entry carrying a different PBA in the temporary L2P address mapping table, wherein said different PBA represents any PBA that is different from the first PBA; and determining a first range of the first entry group in the temporary L2P address mapping table, and filling the first range of the first entry group with a first predetermined value.

5. The method of claim 4, wherein each L2P table entry among the at least one L2P table entry of the first entry group is arranged to carry a physical address, and the physical address comprises a PBA and a physical page address (PPA); and filling the first range of the first entry group with the first predetermined value further comprises:

filling said each L2P table entry, said each L2P table entry carrying the PBA and the PPA, with the first predetermined value.

6. The method of claim 5, wherein the PBA and the PPA are located in a set of first consecutive bits and a set of second consecutive bits among all bits of the physical address, respectively; and filling the first range of the first entry group with the first predetermined value further comprises:

filling a plurality of bits in said each L2P table entry with a first predetermined bit, respectively.

7. The method of claim 4, wherein the first L2P table entry is arranged to carry a first physical address, and the first physical address comprises the first PBA and a first physical page address (PPA), wherein the first PBA and the first PPA are located in a set of first consecutive bits and a set of second consecutive bits among all bits of the first physical address, respectively; and the memory controller is arranged to extract the set of first consecutive bits from said all bits of the first physical address to be the first PBA.

8. A memory controller of a memory device, the memory device comprising the memory controller and a non-volatile (NV) memory, the NV memory comprising at least one NV memory element, the at least one NV memory element comprising a plurality of blocks, the memory controller comprising:

a processing circuit, arranged to control the memory controller according to a plurality of host commands from a host device, to allow the host device to access the NV memory through the memory controller, wherein the processing circuit is arranged to perform mapping table management of the memory device in a predetermined communications architecture with aid of table analysis; and a transmission interface circuit, arranged to perform communications with the host device;

wherein:

the memory controller receives a first command from the host device through the transmission interface circuit of the memory controller, wherein the first command indicates that first partial storage space corresponding to a first logical address range will not be used by the host device, the first command carries first information related to the first logical address range, and the first information comprises at least one first beginning logical address and a first length for indicating the first logical address range; and in response to the first command, the memory controller loads a local logical-to-physical (L2P) address mapping table from the NV memory into a volatile memory within the memory controller to be a temporary L2P address mapping table, determines a first entry group as addresses within the first logical address range starting from the first logical address and corresponding to a first physical block, setting a next sequential L2P table entry in the temporary L2P address mapping table after the first entry group as a second logical address, determines a second entry group as addresses within the first logical address range starting from the second logical address and corresponding to a second physical block, changes multiple L2P table entries in the temporary L2P address mapping table to be multiple updated L2P table entries in a group-by-group manner corresponding to the first entry group and the second entry group, rather than an entry-by-entry manner, and updates the local L2P address mapping table in the NV memory according to the multiple updated L2P table entries of the temporary L2P address mapping table, for unmapping at least one portion of pages among all pages of at least one block of the plurality of blocks, wherein the first partial storage space comprises the at least one portion of pages.

9. The memory device comprising the memory controller of claim 8, wherein the memory device comprises:

the NV memory, wherein the NV memory is configured to store information; and the memory controller, wherein the memory controller is coupled to the NV memory and is configured to control operations of the memory device.

10. An electronic device comprising the memory device of claim 9, and further comprising:

the host device, coupled to the memory device, wherein the host device comprises:

at least one processor, arranged for controlling operations of the host device; and a power supply circuit coupled to the at least one processor and arranged for providing power to the at least one processor and the memory device;

wherein the memory device provides the host device with storage space.

* * * * *